United States Patent
Wei et al.

(10) Patent No.: US 10,285,171 B2
(45) Date of Patent: May 7, 2019

(54) TECHNIQUES FOR FLEXIBLE DUPLEXING

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/738,990

(22) PCT Filed: Jul. 1, 2016

(86) PCT No.: PCT/CN2016/088168
§ 371 (c)(1),
(2) Date: Dec. 21, 2017

(87) PCT Pub. No.: WO2017/020673
PCT Pub. Date: Feb. 9, 2017

(65) Prior Publication Data
US 2018/0192400 A1   Jul. 5, 2018

(30) Foreign Application Priority Data
Aug. 6, 2015 (WO) ................. PCT/CN2015/086214

(51) Int. Cl.
*H04W 72/04* (2009.01)
*H04W 72/14* (2009.01)
(Continued)

(52) U.S. Cl.
CPC ......... *H04W 72/042* (2013.01); *H04W 28/04* (2013.01); *H04W 72/0446* (2013.01);
(Continued)

(58) Field of Classification Search
None
See application file for complete search history.

(56) References Cited

U.S. PATENT DOCUMENTS

2010/0278084 A1* 11/2010 Jones ................. H04W 16/14
370/281
2010/0290369 A1   11/2010 Hui et al.
(Continued)

FOREIGN PATENT DOCUMENTS

| CN | 103249163 A | 8/2013 |
|---|---|---|
| CN | 103580830 A | 2/2014 |

(Continued)

OTHER PUBLICATIONS

International Search Report and Written Opinion—PCT/CN2015/086214—ISA/EPO—dated May 4, 2016. 11 pages.
(Continued)

*Primary Examiner* — Hong S Cho
(74) *Attorney, Agent, or Firm* — Arent Fox LLP

(57) ABSTRACT

The present disclosure, for example, generally relates to wireless communication systems, and more particularly to techniques for flexible duplexing in such systems. For example, a technique for flexible duplexing provides a reference configuration that determines characteristics for paired frequency division duplexing (FDD) bands when the uplink band is temporarily reconfigured for time division duplexing (TDD) use. A user equipment (UE) may use the reference configuration to determine hybrid automatic repeat request (HARQ) timing, schedule uplink transmissions, manage a soft buffer, and determine signaling formats. In an aspect, the UE may receive a reconfiguration message indicating a change for an FDD uplink band to a temporary TDD band. The UE may then determine a reference configuration for a pair of FDD bands including an FDD
(Continued)

downlink band and the temporary TDD band, the reference configuration indicating a pattern of sub-frames associated with the pair of FDD bands.

30 Claims, 16 Drawing Sheets

(51) Int. Cl.
    *H04W 28/04*      (2009.01)
    *H04W 72/12*      (2009.01)
    *H04L 1/18*      (2006.01)

(52) U.S. Cl.
    CPC ... *H04W 72/0453* (2013.01); *H04W 72/1268* (2013.01); *H04W 72/14* (2013.01); *H04J 2211/005* (2013.01); *H04L 1/1812* (2013.01)

(56) References Cited

U.S. PATENT DOCUMENTS

| | | | |
|---|---|---|---|
| 2011/0205976 A1 | 8/2011 | Roessel et al. | |
| 2013/0208634 A1 | 8/2013 | Ji et al. | |
| 2013/0343239 A1 | 12/2013 | Damnjanovic et al. | |
| 2014/0050140 A1* | 2/2014 | Fong | H04L 1/1812 370/312 |
| 2015/0055519 A1* | 2/2015 | Lin | H04L 1/1607 370/280 |
| 2016/0164622 A1* | 6/2016 | Yi | H04B 7/2656 370/280 |
| 2018/0019859 A1 | 1/2018 | Cheng et al. | |

FOREIGN PATENT DOCUMENTS

| | | |
|---|---|---|
| CN | 104579596 A | 4/2015 |
| EP | 1259092 A2 | 11/2002 |
| WO | WO-2013192601 A2 | 12/2013 |
| WO | 2015012655 A1 | 1/2015 |
| WO | 2016138662 A1 | 9/2016 |

OTHER PUBLICATIONS

International Search Report and Written Opinion—PCT/CN2016/088168—ISA/EPO—dated Aug. 31, 2016. 11 pages.
NTT Docomo, Inc.: "PCell Mandatory/optional Support for TDD-FDD CA", 3GPP TSG RAN Meeting #68 RP-150818 Jun. 18, 2015 (Jun. 18, 2015) the whole document. pp. 1-4.
Supplementary European Search Report—EP16832161—Search Authority—The Hague—dated Feb. 14, 2019.

* cited by examiner

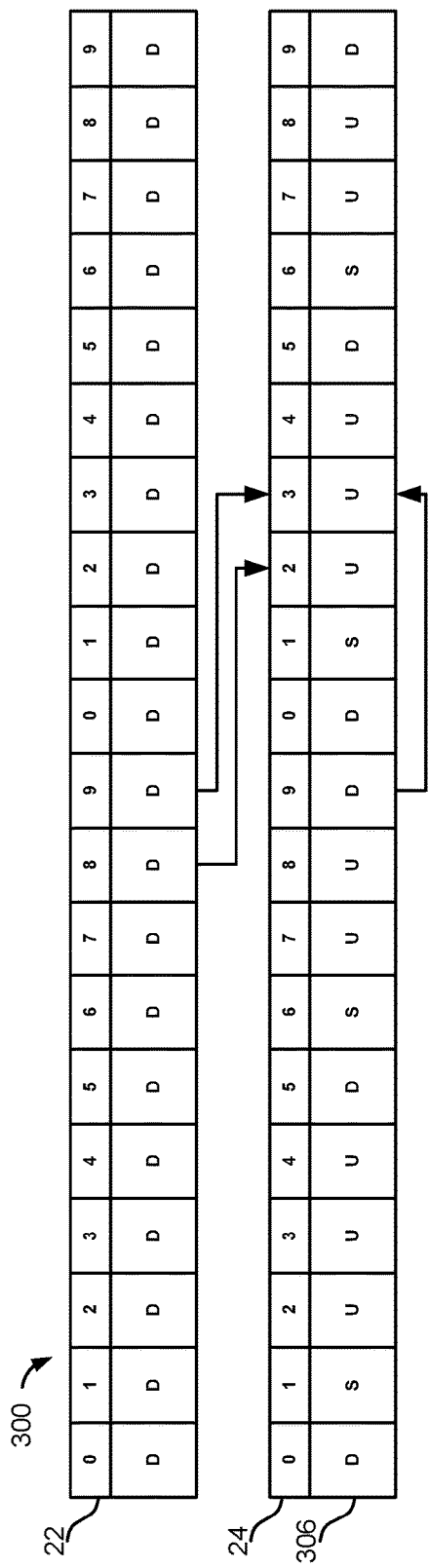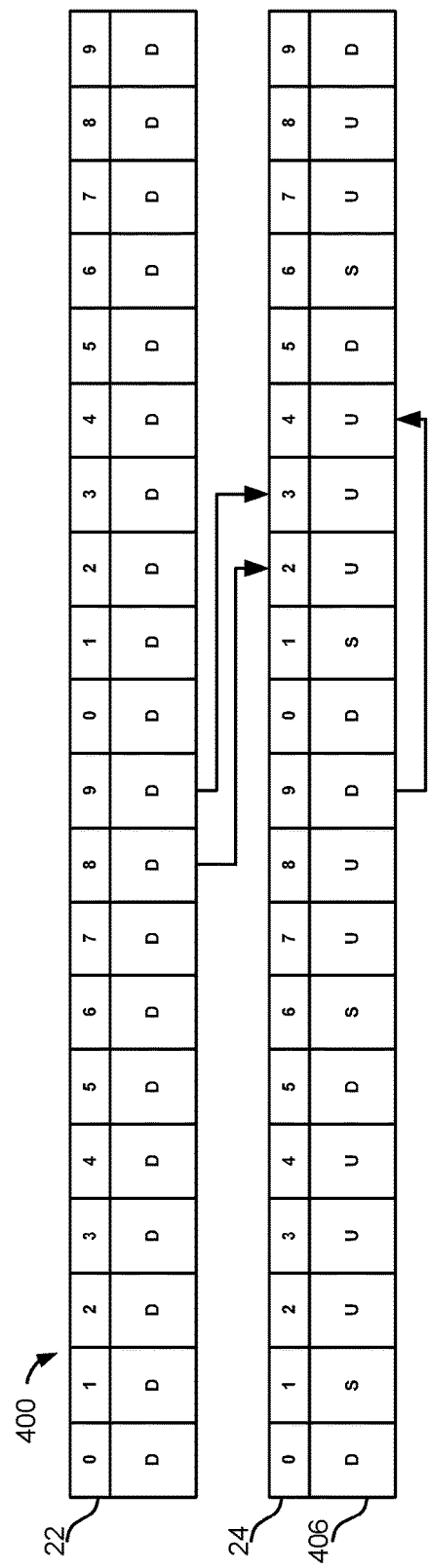

TECHNIQUES FOR FLEXIBLE DUPLEXING

RELATED APPLICATIONS

This application is a National Stage entry of PCT Application No. PCT/CN2016/088168 entitled "TECHNIQUES FOR FLEXIBLE DUPLEXING," filed on Jul. 1, 2016, which claims priority from PCT Application No. PCT/CN 2015/086214 entitled "TECHNIQUES FOR FLEXIBLE DUPLEXING, " filed on Aug. 6, 2015, which is incorporated herein by reference in its entirety.

BACKGROUND

Field of the Disclosure

The present disclosure relates generally to communication systems, and more particularly to techniques for providing flexible duplexing in wireless communication systems.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

LTE and other cellular technologies may allow for flexibility in the way duplexing techniques can be applied, generally referred to as flexible duplex or flexible duplexing. This flexibility may allow for an increase in the amount of downlink bandwidth that is available in order to accommodate greater downlink traffic demand. However, the use of flexible duplexing may result in ambiguities regarding timing characteristics, causing issues with various communications operations, including retransmission operations. Accordingly, there is a need for more effective flexible duplexing mechanisms.

SUMMARY

The present disclosure, for example, generally relates to wireless communication systems, and more particularly to techniques for flexible duplexing. For example, a technique for flexible duplexing provides a reference configuration that determines characteristics for paired frequency division duplex (FDD) bands (e.g., uplink band and respective downlink band) when the uplink band is temporarily reconfigured to use time division duplex (TDD). A UE may use the reference configuration to determine HARQ timing, schedule uplink transmissions, manage a soft buffer, and determine signaling formats.

In an aspect, the disclosure provides a method of wireless communications. The method may include receiving a reconfiguration message indicating a change for a FDD uplink band to a temporary TDD band. The method may further include determining a reference configuration for a pair of FDD bands including an FDD downlink band and the temporary TDD band, the reference configuration indicating a pattern of sub-frames associated with the pair of FDD bands.

The method may optionally include determining a hybrid automatic repeat request (HARQ) timing for the FDD downlink band based on the reference configuration and transmitting an acknowledgment status signal on the temporary TDD band in response to a transmission received on the FDD downlink band based on the HARQ timing, wherein the acknowledgment status signal is an acknowledgment (ACK) signal or a negative-acknowledgment (NACK). Determining the HARQ timing may include determining an uplink sub-frame of the temporary TDD band in which to transmit the acknowledgment status signal based on the reference configuration. The pair of FDD bands may be aggregated and the FDD downlink band may be associated with a primary cell.

The method of may also optionally include receiving a grant on a downlink sub-frame of the temporary TDD band, the grant scheduling an uplink transmission on the temporary TDD band and determining an uplink sub-frame for the uplink transmission based on an FDD uplink HARQ timing.

The method of may also optionally include receiving a grant on a downlink sub-frame of the temporary TDD band, the grant scheduling an uplink transmission on the temporary TDD band and determining an uplink sub-frame for the uplink transmission based on the reference configuration. The method may also optionally include determining an uplink HARQ process number for the uplink transmission based on a 3-bit HARQ process number included in the grant.

The method of may also optionally include: determining that the pair of FDD bands are not aggregated with at least one second band; identifying the FDD downlink band and the temporary TDD band as being associated with separate cells based on the determining that the pair of FDD bands are not aggregated with at least a second band; allocating a soft buffer to each of the FDD downlink band and the temporary TDD band by equally dividing a total number of soft channel bits between the FDD downlink band and the temporary TDD band; and determining a maximum number of HARQ processes for each of the FDD downlink band and the temporary TDD band based on the reference configuration, wherein the maximum number of HARQ processes is used for soft buffer management in each separate cell.

The method of may also optionally include: determining that the pair of FDD bands are aggregated with at least one second band; identifying the FDD downlink band and the temporary TDD band as being associated with a single cell in response to determining that the pair of FDD bands are aggregated with the at least one second band; allocating a soft buffer to be shared between the FDD downlink band and the temporary TDD band; and determining a maximum number of HARQ processes for the single cell of the FDD downlink band and the temporary TDD band based on the reference configuration, wherein the maximum number of HARQ processes is used for soft buffer management. The method may further include receiving a downlink transmission either on the FDD downlink band or on the temporary TDD band but not simultaneously.

The method may also optionally include determining a downlink control information (DCI) format, a HARQ timing, and a physical uplink control channel (PUCCH) resource mapping for an uplink sub-frame of the temporary TDD band based on a band used to receive a physical downlink control channel (PDCCH) and a search space used to receive the PDCCH. The determining may include determining the downlink control information (DCI) format, the HARQ timing, and the PUCCH resource mapping based on an FDD format in response to the PDCCH being received on the FDD downlink band in a common search space. Alternatively, the determining may include determining the downlink control information (DCI) format, the HARQ timing, and the PUCCH resource mapping based on a TDD format applicable to the reference configuration in response to the PDCCH being received on the temporary TDD band or in a user equipment (UE) specific search space.

The method may also optionally include determining a DCI format, a HARQ timing, and a PUCCH resource mapping for an uplink sub-frame of the temporary TDD band based on a downlink sub-frame used to receive a physical downlink control channel (PDCCH) and the reference configuration. The downlink sub-frame may have a sub-frame index a fixed number of sub-frames before the UL sub-frame based on the reference configuration, and an FDD formatting may be used for the DCI format, the HARQ timing, and the PUCCH resource mapping. Alternatively, the downlink sub-frame may not have a sub-frame index a fixed number of sub-frames before the UL sub-frame based on the reference configuration and a TDD formatting may be used for the DCI format, the HARQ timing and the PUCCH resource mapping.

The method may also optionally include transmitting an uplink sounding reference signal (SRS) in a special sub-frame of the temporary TDD band based on a TDD reporting format, wherein an uplink timing advance control and a power control for SRS transmission are based on an FDD format.

The method may optionally include determining whether the FDD downlink band is associated with a primary cell or a secondary cell and determining a periodic channel state information (CSI) reporting format based on whether the FDD downlink band is associated with the primary cell or the secondary cell. The method may further include transmitting a periodic CSI report based on a TDD reporting format in response to determining that the FDD downlink band is associated with the primary cell. Alternatively, the method may include transmitting a periodic CSI report based on a CSI reporting format of the primary cell in response to determining that the FDD downlink band is associated with the secondary cell.

In another aspect, the disclosure provides an apparatus for wireless communications. The apparatus may include means for receiving a reconfiguration message indicating a change for a FDD uplink band to a temporary TDD band. The apparatus may further include means for determining a reference configuration for a pair of FDD bands including an FDD downlink band and the temporary TDD band, the reference configuration indicating a pattern of sub-frames associated with the pair of FDD bands. The apparatus may additionally include means for performing the method as described above.

In another aspect, the disclosure provides another apparatus for wireless communications. The apparatus may include transceiver configured to receive sub-frames of a downlink channel. The apparatus may also include a memory and at least one processor communicatively coupled to the transceiver and to the memory via at least one bus. The at least one processor may be configured to receive a reconfiguration message indicating a change for a FDD uplink band to a temporary TDD band. The at least one processor may be further configured to determine a reference configuration for a pair of FDD bands including an FDD downlink band and the temporary TDD band, the reference configuration indicating a pattern of sub-frames associated with the pair of FDD bands. The at least one processor may be further configured to perform the method as described above.

In another aspect, the disclosure provides a computer-readable medium storing computer executable code for wireless communications. The computer-readable medium may include code for receiving a reconfiguration message indicating a change for a FDD uplink band to a temporary TDD band. The computer-readable medium may further include code for determining a reference configuration for a pair of FDD bands including an FDD downlink band and the temporary TDD band, the reference configuration indicating a pattern of sub-frames associated with the pair of FDD bands. The computer-readable medium may further include code for performing the method described above. The computer-readable medium may be a non-transitory computer-readable medium storing computer executable code.

Various aspects and features are described in further detail below with reference to various examples thereof as shown in the accompanying drawings. While the aspects are described below with reference to various examples, it should be understood that the described aspects are not so limited. Those of ordinary skill in the art having access to the teachings herein will recognize additional implementations, modifications, and examples, as well as other fields of use, which are within the scope of the aspects described herein, and with respect to which the described aspects may be of significant utility.

BRIEF DESCRIPTION OF THE DRAWINGS

FIG. 3 is block diagram conceptually illustrating an example of a reference configuration for uplink scheduling and HARQ timing in flexible duplex.

FIG. 4 is block diagram conceptually illustrating another example of a reference configuration for uplink scheduling and HARQ timing in flexible duplex.

DETAILED DESCRIPTION

Figure 1:
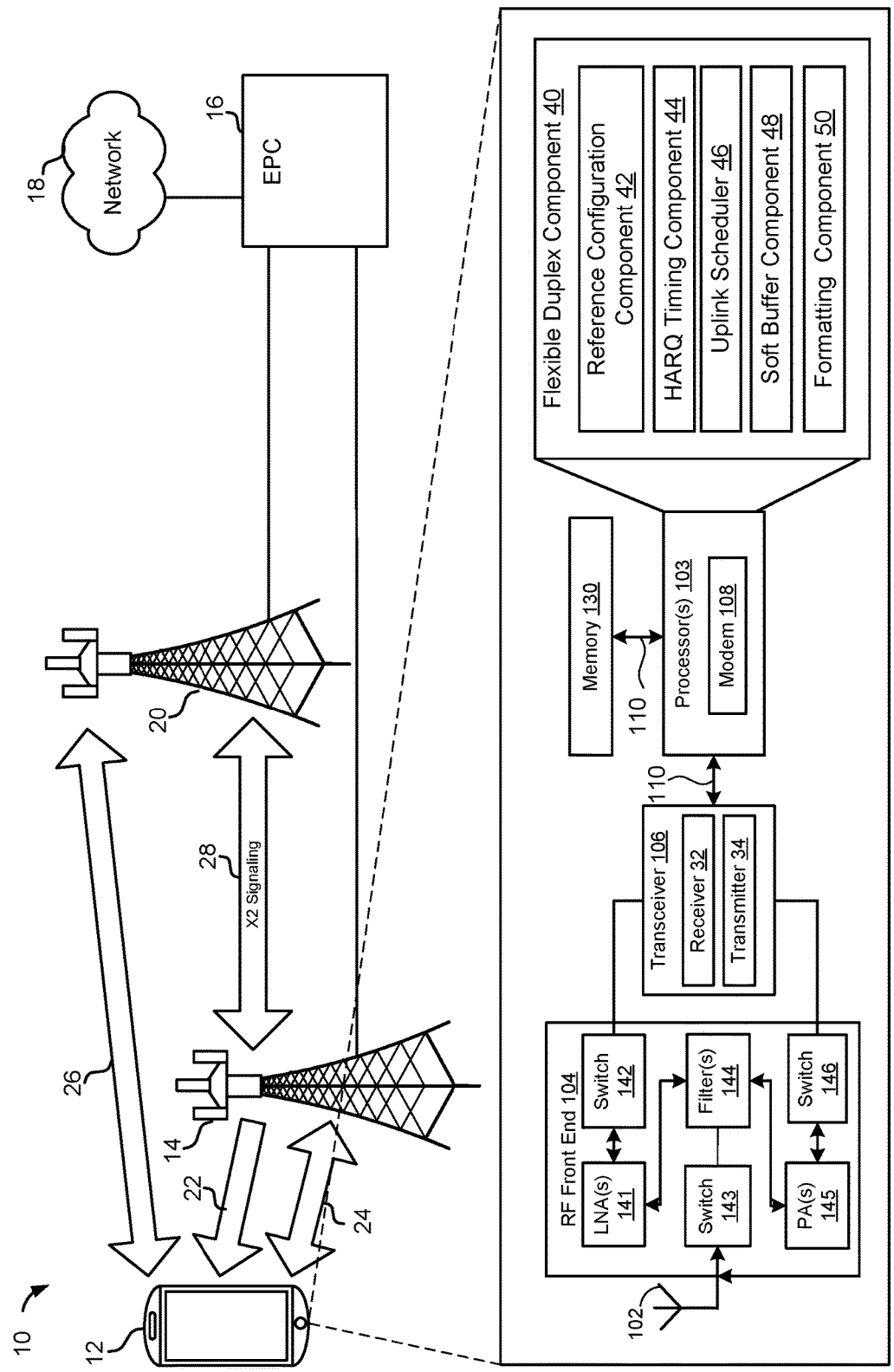
FIG. 1 is a diagram illustrating an example of a communications system including a user equipment in communication with an evolved node B using flexible duplex.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In an aspect, the present disclosure provides a design for communications in a flexible duplexing scenario. In a flexible duplexing scenario, an evolved Node B (eNB) providing a cell using frequency division duplexing (FDD) may reconfigure the cell and a UE to use time division duplexing (TDD) on an FDD uplink band, for example, based on a large downlink load for the UE. The cell may continue to use the FDD uplink band as an FDD uplink band for other UEs. Further, the cell may change back to the FDD uplink configuration for the UE at any time, for example, when the UE indicates a higher level of uplink traffic. Accordingly, the reconfigured band may be referred to as a temporary TDD band. Additionally, the FDD downlink band may be used for downlink traffic and some time slots of the FDD uplink band (or temporary TDD band) may also be used for downlink traffic. Accordingly, flexible duplexing may increase downlink throughput by repurposing an uplink resource.

The reconfiguration of an FDD uplink band may affect information typically carried on the FDD uplink band. For example, downlink (DL) hybrid automatic repeat request (HARQ) status acknowledgment signals may be typically carried on a physical uplink control channel (PUCCH) carried on the FDD uplink band. When the FDD uplink band is reconfigured, the temporary TDD band may not be able to transmit the status acknowledgment signals in every sub-frame. In another aspect, uplink HARQ retransmissions may be interrupted because an uplink sub-frame for the retransmission may now be a downlink sub-frame. In another aspect, the increase in the number of downlink sub-frames may increase a number of HARQ processes and place strains on downlink decoding resources such as a soft buffer. Further, formatting for various information signaled between the UE and eNB may typically be based on the duplexing configuration. Because flexible duplexing allows both FDD and TDD to be used, the applicable format may be ambiguous.

The disclosure provides for a flexible duplex design that addresses the above issues. A reference configuration applicable to both the FDD downlink band and the temporary TDD band may be used to determine HARQ timing for downlink and/or uplink. Further, a "soft buffer" for storing log likelihood ratios (LLR) for soft decoding decisions may be affected by flexible duplex. The soft buffer may be managed based on carrier aggregation techniques depending on whether the FDD downlink band and the temporary TDD band are aggregated with other carriers. The disclosure also provides for determining signal formatting.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Referring to FIG. 1, in an aspect, a wireless communication system 10 includes an evolved nodeB (eNB) 14 in communication with user equipment (UE) 12. The eNB 14 may provide a cell. The terms "eNB" and "cell" may be used interchangeably herein and may refer either an eNB or the cell provided by the eNB depending on the context. A second eNB 20 may also be in communication with the UE 12. The eNB 14 and the eNB 20 may communicate with each other via a communication link 28 carrying X2 interface signaling. The eNB 14 and the eNB 20 may also communicate with an evolved packet core (EPC) 16. In an aspect, the eNB 14 may use flexible duplexing to offload downlink traffic from an FDD downlink band 22 to an FDD uplink band 24 by reconfiguring the FDD uplink band 24 for TDD transmissions. Accordingly, the FDD uplink band 24 may be referred to as a temporary TDD band 24. With the additional resources used for DL in the FDD uplink band 24, additional DL capacity may be achieved compared to that available by only using FDD downlink band 22 alone. In an aspect, an FDD uplink band 24 may refer to a frequency range that may be used by at least one cell for uplink transmissions. Accordingly, an FDD uplink band that has been temporarily reconfigured as a TDD band may also be referred to as an FDD uplink band.

A UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. A UE 12 may be able to communicate with macro eNBs, pico eNBs, femto eNBs, relays, and the like.

An eNB 14 may provide a cell serving the UE 12. In some aspects, multiple UEs such as UE 12 may be in communication coverage with one or more eNBs, including eNB 14 and eNB 20. An eNB 14 may be a station that communicates with the UE 12 and may also be referred to as a base station, an access point, a NodeB, etc. Each eNB, such as eNB 14 may provide communication coverage for a particular geographic area. In 3GPP, the term "cell" can refer to a coverage area of an eNB 14 and/or an eNB subsystem serving the coverage area, depending on the context in which the term is used. For example, the eNB 14 may be the cell where the UE 12 initially performs a connection establishment procedure. Such a cell may be referred to as a primary cell or Pcell. Another eNB 20 may be operating on a second frequency band 26 and may be referred to as a secondary cell or SCell. The second frequency band 26 may use either FDD or TDD. It should be apparent that an eNB may operate as either a primary cell or a secondary cell depending on the connection state of the UE 12. A cell identifier (ID) such as a primary cell identifier (PCI) may be mapped to an eNB. A UE may be within the coverage areas of multiple eNBs. One of these eNBs may be selected to serve the UE. The serving eNB may be selected based on various criteria including radio resource monitoring measurements and radio link monitoring measurements such as received power, path loss, signal-to-noise ratio (SNR), etc.

An eNB 14 may provide communication coverage for a macro cell, a small cell, a pico cell, a femto cell, and/or other types of cell. A macro cell may cover a relatively large geographic area (e.g., several kilometers in radius) and may allow unrestricted access by UEs 12 with service subscription. The term "small cell," as used herein, refers to a relatively low transmit power and/or a relatively small coverage area cell as compared to a transmit power and/or a coverage area of a macro cell. Further, the term "small cell" may include, but is not limited to, cells such as a femto cell, a pico cell, access point base stations, Home NodeBs, femto access points, or femto cells. For instance, a macro cell may cover a relatively large geographic area, such as, but not limited to, several kilometers in radius. In contrast, a pico cell may cover a relatively small geographic area and may allow unrestricted access by UEs 12 with service subscription. A femto cell may cover a relatively small geographic area (e.g., a home) and may allow restricted access by a UE 12 having association with the femto cell (e.g., UE 12 may be subscribed to a Closed Subscriber Group (CSG), for users in the home, etc.). An eNB 14 for a macro cell may be referred to as a macro eNB. An eNB 14 for a pico cell may be referred to as a pico eNB. An eNB 14 for a femto cell may be referred to as a femto eNB or a home eNB.

A UE 12 may include a flexible duplex component 40. The flexible duplex component 40 may implement a flexible duplex design at the UE 12. According to the present aspects, the UE 12 may include one or more processors 103 that may operate in combination with the flexible duplex component 40 to implement at least the flexible duplex design aspects described in this disclosure. In an aspect, the term "component" as used herein may be one of the parts that make up a system, may be hardware, firmware, and/or software, and may be divided into other components. The flexible duplex component 40 may be communicatively coupled to a transceiver 106, which may include a receiver 32 for receiving and processing RF signals and a transmitter 34 for processing and transmitting RF signals. The flexible duplex component 40 may include a reference configuration component 42 for determining reference configuration for a pair of FDD bands, a HARQ timing component 44 for determining HARQ timing for the FDD downlink band and/or the temporary TDD band, an uplink scheduler 46 for determining a sub-frame for a scheduled uplink transmission, a soft buffer component 48 for providing and managing one or more soft buffers, and a formatting component 50 for formatting transmissions. The processor 103 may be coupled to the transceiver 106 and a memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive and decode signals transmitted by the eNB 14. The receiver 32 may determine a status of a received signal (e.g., a physical downlink shared channel (PDSCH)) for each downlink sub-frame the FDD downlink band 122 and/or the temporary TDD band 124. In an aspect, the receiver 32 may receive a reconfiguration message indicating a change for a FDD uplink band to a temporary TDD band. The receiver 32 may decode the reconfiguration message and pass the reconfiguration message to the flexible duplex component 40.

The transmitter 34 may include hardware, firmware, and/or software code executable by a processor for transmitting data, the code comprising instructions and being stored in a memory (e.g., computer-readable medium). The transmitter 34 may be, for example, an RF transmitter. The transmitter 34 may transmit signals determined by the processor 103 and/or the flexible duplex component 40 such as, for example, a physical uplink control channel (PUCCH).

In an aspect, the one or more processors 103 can include a modem 108 that uses one or more modem processors. The various functions related to flexible duplex component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement one or more sub-components included in flexible duplex component 40.

The reference configuration component 42 may include hardware, firmware, and/or software code executable by processor 103 for determining a reference configuration for a pair of FDD bands, the code comprising instructions and being stored in a memory (e.g., computer-readable medium). In an aspect, the reference configuration component 42 may determine a reference configuration for a pair of FDD bands including the FDD downlink band 22 and the temporary TDD band 24. In an aspect, the reference configuration may indicate a pattern of sub-frames associated with the pair of FDD bands. For example, the reference configuration may be a pattern of sub-frames including one or more of: a downlink sub-frame, an uplink sub-frame, or a special sub-frame. In an aspect, the reference configuration may be the pattern of sub-frames for the temporary TDD band 24. The reference configuration may also apply to the FDD downlink band 22, for example, for control and signaling.

The HARQ timing component 44 may include hardware, firmware, and/or software code executable by processor 103 for determining HARQ timing for the FDD downlink band and/or the temporary TDD band, the code comprising instructions and being stored in a memory (e.g., computer-readable medium). In an aspect, the HARQ timing component 44 may determine HARQ timing for the FDD downlink band based on the reference configuration. For example, the HARQ timing component 44 may determine an uplink sub-frame of the temporary TDD band 24 in which to transmit an acknowledgment status signal.

The uplink scheduler 46 may include hardware, firmware, and/or software code executable by processor 103 for determining a sub-frame for a scheduled uplink transmission, the code comprising instructions and being stored in a memory (e.g., computer-readable medium). The uplink scheduler 46 may determine the sub-frame for a scheduled uplink transmission based on a sub-frame in which a grant is received on either the FDD downlink band 22 or the temporary TDD band 24. In an aspect, the uplink scheduler 46 may schedule an uplink transmission (e.g., a PUSCH transmission) in an uplink sub-frame of the temporary TDD band 24 based on FDD uplink HARQ timing when a grant is received on the FDD downlink band 22. For example, the scheduled uplink sub-frame may be a fixed number of sub-frames (e.g., 4) after the received grant. The eNB 14 may transmit the grant in a sub-frame such that the scheduled sub-frame will map to an uplink sub-frame of the temporary TDD band 24. In another aspect, the uplink scheduler 46 may schedule an uplink transmission in an uplink sub-frame of the temporary TDD band 24 based on the reference configuration when the uplink grant is received on the temporary TDD band 24. The uplink scheduler 46 may also determine a HARQ process number for the uplink transmission. For example, the HARQ process number may be based on a 3-bit HARQ process number included in the grant.

The soft buffer component 48 may include hardware, firmware, and/or software code executable by processor 103 for managing one or more soft buffers, the code comprising instructions and being stored in a memory (e.g., computer-readable medium). In an aspect, the soft buffer component 48 may further include a physical memory (e.g., random access memory (RAM)) for providing one or more soft buffers. A soft buffer may store LLR information for received transmissions. The soft buffer component 48 may manage the soft buffer using HARQ processes. The memory bits assigned to a HARQ process may be updated when a retransmission is received for the HARQ process and erased and rewritten when a new transmission is received for a HARQ process. In an aspect, in order to allocate soft buffer space, the soft buffer component 48 may determine whether the pair of FDD bands 22, 24 is aggregated with at least one second band.

If the pair of FDD bands 22, 24 are not aggregated with at least one second band, the soft buffer component 48 may identify the FDD downlink band 22 and the temporary TDD band 24 as separate cells for purposes of soft buffer management. The soft buffer component 48 may allocate a soft buffer to each of the FDD downlink band 22 and the temporary TDD band 24 by equally dividing a total number of soft channel bits (e.g., in a physical memory) between the FDD downlink band 22 and the temporary TDD band 24. Further, the soft buffer component 48 may determine a maximum number of HARQ processes for each of the FDD downlink band 22 and the temporary TDD band 24 based on the reference configuration.

If the pair of FDD bands 22, 24 are aggregated with at least one second band, the soft buffer component 48 may identify the FDD downlink band and the temporary TDD band as being associated with a single cell. The soft buffer component 48 may allocate a soft buffer to be shared between the FDD downlink band 22 and the temporary TDD band 24. The soft buffer component 48 may determine a maximum number of HARQ processes for the single cell of the FDD downlink band and the temporary TDD band based on the reference configuration. In an aspect, the UE 12 may receive a downlink transmission on either the FDD downlink band 22 or on the temporary TDD band 24, but not simultaneously. In an aspect, the pair of FDD bands 22, 24 may receive half as many HARQ processes when aggregated with at least one second band. The limited number of HARQ processes may prevent simultaneously receiving a transmission on each of the FDD bands 22, 24.

The formatting component 50 may include hardware, firmware, and/or software code executable by processor 103 for determining a format of a transmission, the code comprising instructions and being stored in a memory (e.g., computer-readable medium). In an aspect, for example, the formatting component 50 may determine a downlink control information (DCI) format, a HARQ timing, and a PUCCH resource mapping based on a band used to receive a physical downlink control channel (PDCCH) and a search space used to receive the PDCCH. For example, if the PDCCH is received on the FDD downlink band 22 in a common search space, FDD formatting may be used. If the PDCCH is received on the temporary TDD band 24 and/or the PDCCH is received in a UE specific search space, TDD formatting may be used. In another aspect, the formatting component 50 may determine the DCI format, the HARQ timing, and the PUCCH resource mapping based on a sub-frame index and the reference configuration. For example, if the PDCCH is received in a downlink sub-frame that is a fixed number of sub-frames (e.g., 4) before the UL sub-frame based on the reference configuration, FDD formatting may be used. If the PDCCH is received in a downlink sub-frame that is not a fixed number of sub-frames (e.g., 4) before the UL sub-frame based on the reference configuration, TDD formatting may be used.

The formatting component 50 may also determine the formatting of a channel state information (CSI), or of some other channel quality indicator. In an aspect, the formatting component 50 may determine whether the FDD downlink band 22 is associated with a primary cell or a secondary cell. The formatting component 50 may then determine the CSI formatting based on whether the FDD downlink band 22 is associated with a primary cell or a secondary cell. If the FDD downlink band 22 is associated with the primary cell, the formatting component 50 may format a periodic CSI report based on a TDD reporting format. If the FDD downlink band 22 is associated with a secondary cell, the formatting component 50 may format a periodic CSI report based on a CSI reporting format of the primary cell. The formatting component 50 may pass a formatted CSI report to the transmitter 34.

Moreover, in an aspect, UE 12 may include RF front end 104 and transceiver 106 for receiving and transmitting radio transmissions, for example, on the FDD downlink band 22 and the temporary TDD band 24 used by the eNB 14 or on the second frequency band 26 used by the eNB 20. For example, transceiver 106 may receive a packet on the PDSCH or transmitted by the eNB 14. UE 12, upon receipt of an entire message, may decode the packet and perform a cyclic redundancy check (CRC) to determine whether the packet was received correctly. For example, transceiver 106 may communicate with modem 108 to transmit messages generated by flexible duplex component 40 and to receive messages and forward them to flexible duplex component 40.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA 141, and/or PA 145, based on a configuration as specified by transceiver 106 and/or processor 103.

Transceiver 106 may be configured to transmit and receive wireless signals through antenna 102 via RF front end 104. In an aspect, transceiver 106 may be tuned to operate at specified frequencies such that UE 12 can communicate with, for example, eNB 14 or eNB 20. In an aspect, for example, modem 108 can configure transceiver 106 to operate at a specified frequency and power level based on the UE configuration of the UE 12 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 12 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information associated with UE 12 as provided by the network during cell selection and/or cell reselection.

UE 12 may further include a memory 130, such as for storing data used herein and/or local versions of applications or channel quality component 30 and/or one or more of its subcomponents being executed by processor 103. Memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining flexible duplex component 40 and/or one or more of its subcomponents, and/or data associated therewith, when UE 12 is operating processor 103 to execute flexible duplex component 40 and/or one or more of its subcomponents. In another aspect, for example, memory 130 may be a non-transitory computer-readable storage medium.

Figure 2:
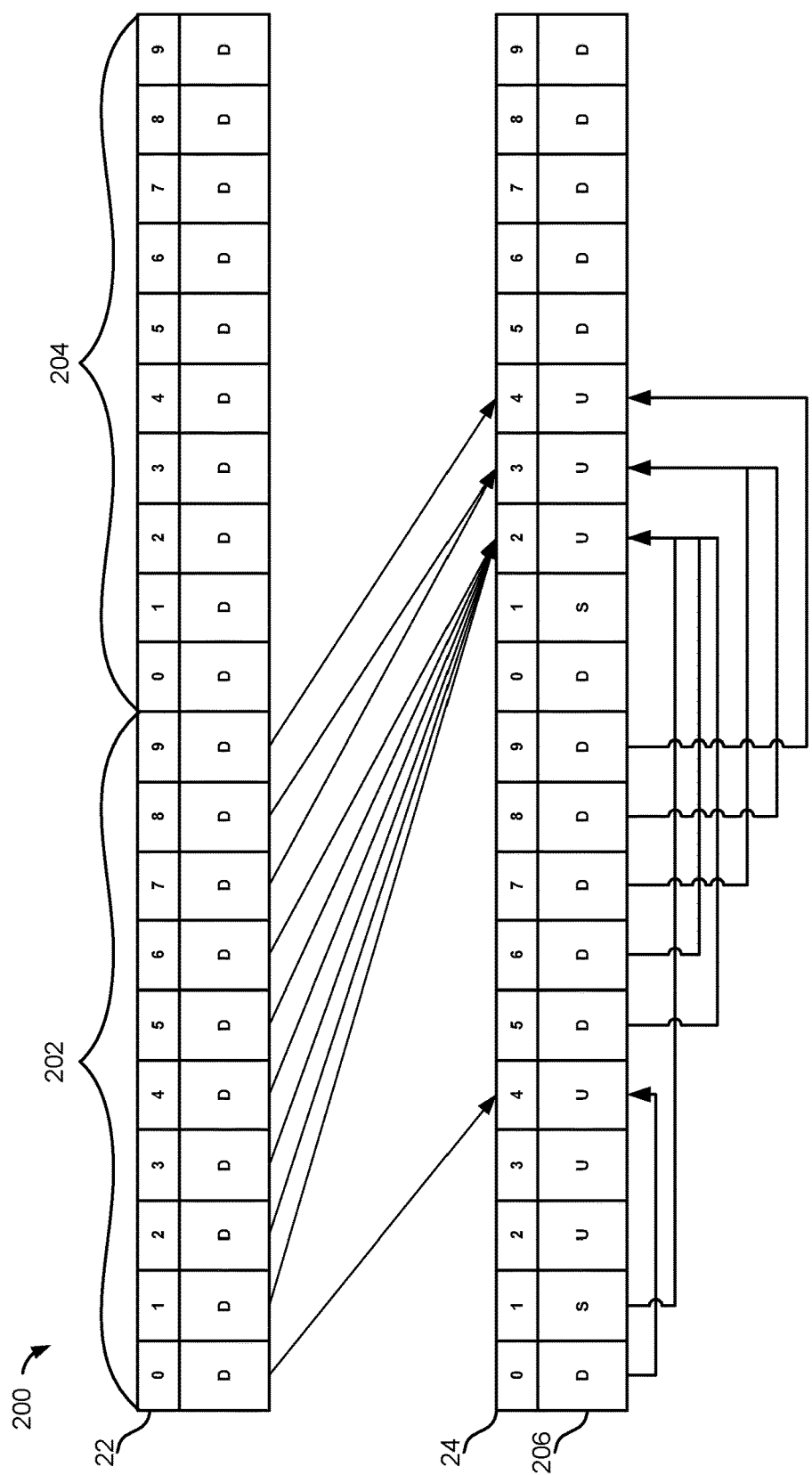
FIG. 2 is a block diagram conceptually illustrating an example of a reference configuration for downlink HARQ timing in flexible duplex.

FIG. 2 shows a block diagram 200 conceptually illustrating an example of a UL/DL configuration for downlink HARQ timing in flexible duplex. The eNB 14 may be configured with an FDD downlink band 22 and a temporary TDD band 24 as illustrated in FIG. 1. Radio frames 202 and 204 may be carried on each band. Each radio frame 202, 204 may be, for example, 10 milliseconds (ms) and be divided into 10 sub-frames with sub-frame indices 0-9. In the FDD downlink band 22, each sub-frame may be designated for downlink (D) transmission. In the temporary TDD band 24, each sub-frame may be designated as downlink (D), uplink (U), or special (S). In TDD, a single band of 1.4-20 MHz may be used to carry both uplink and downlink transmissions. For example, the FDD uplink band 24 may be reconfigured as a temporary TDD band 24 carrying both UL and DL transmissions. In TDD, the UL transmissions and DL transmissions may be separated in the time domain by a guard period to prevent interference. The FDD UL band 24, when operating in TDD, may follow a reference configuration 206, which may also be referred to as a TDD frame configuration. The reference configuration 206 may include, for example, a first downlink sub-frame at index 0 followed by a special sub-frame at index 1, then a number of uplink sub-frames at, for example, indices 2-4. The special sub-frame may include a guard period. After a switching point, which may include another guard period, the remainder of the TDD frame configuration may include downlink sub-frames at indices 4-9. In the example shown in FIG. 2, the eNB 14 may configure the FDD UL band 24 with a reference frame configuration having 6 downlink sub-frames, 1 special sub-frame, and 3 uplink sub-frames. Accordingly, the eNB 14 may offload downlink transmissions from the FDD downlink band 22 to the FDD UL band 24. As necessary (e.g., depending on load), the eNB 14 may switch back to FDD or continue to use TDD for offloading.

It should be appreciated that the TDD frame configuration may include other combinations of downlink, special, and uplink sub-frames, which may be selected based on the desired amount of offloading. Moreover, a TDD frame configuration may have a switching periodicity (e.g., 5 ms or 10 ms), which may correspond to the number of special sub-frames. A TDD frame configuration may be identified by a configuration index. Table 1 illustrates examples of TDD frame configurations that may be used. As illustrated, FIG. 2 may be an example of TDD frame configuration 3.

TABLE 1

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 2 further illustrates downlink HARQ signaling. A status acknowledgment signal may be transmitted only in an uplink sub-frame on the temporary TDD band 24 based on the reference configuration 206. For example, as illustrated in FIG. 2, only sub-frames at indices 2-4 may be available for the status acknowledgment signal (e.g., acknowledgment or ACK signal, negative-acknowledgment or NACK signal). For each downlink sub-frame, the arrow points to an uplink sub-frame that may carry the status acknowledgment signal. In an aspect, downlink HARQ reporting may follow the reference configuration 206 of the temporary TDD band 24. A status acknowledgment signal for the downlink sub-frames of the temporary TDD band 24 may transmitted in an uplink sub-frame defined based on the reference configuration. For example, for reference configuration 3, the sub-frame at index 0 may be acknowledged in the sub-frame at index 4, sub-frames at indices 1, 5, and 6 may be acknowledged in the sub-frame at index 2 of the next frame 204, sub-frames at indices 7 and 8 may be acknowledged in the sub-frame at index 3 of the next frame 204, and the sub-frame at index 9 may be acknowledged in the sub-frame at index 4 of the next frame 204. For the FDD downlink band 22, sub-frames that have a corresponding downlink sub-frame in the temporary TDD band 24 may use the corresponding uplink sub-frame for the status acknowledgment signal. For sub-frames with no corresponding downlink sub-frame in the temporary TDD band 24, the status acknowledgment signal may be transmitted in the next uplink sub-frame of the reference configuration 206 that is at least 4 sub-frames after the downlink sub-frame. For example, the sub-frame at index 0 may be acknowledged in the sub-frame at index 4, sub-frames at indices 1-6 may all be acknowledged in the sub-frame at index 2 of the next frame 204, sub-frames at indices 7 and 8 may be acknowledged in the sub-frame at index 3 of the next frame 204, and the sub-frame at index 9 may be acknowledged in the sub-frame at index 4 of the next frame 204.

FIG. 3 shows a block diagram 300 conceptually illustrating an example of a reference configuration for uplink scheduling and HARQ timing in flexible duplex. As discussed above, FDD downlink band 22 may be configured for only downlink sub-frames. The temporary TDD band 24 may be configured with a reference configuration 306, which may correspond to, for example, TDD frame configuration 6 in Table 1. Uplink transmissions (e.g., for a physical uplink shared channel (PUSCH) may be scheduled by a grant received in a downlink sub-frame on either the FDD downlink band 22 or the temporary TDD band 24. In an aspect, grants received on the FDD band may be applied to an uplink sub-frame that is a fixed number of sub-frames after the grant. For example, a grant received in sub-frame index 8 may be applied in the following sub-frame at index 2. The eNB 14 may only transmit grants in downlink sub-frames that map to uplink sub-frames in the reference configuration. In another aspect, grants received on the TDD band may be applied to an uplink sub-frame that is a fixed number of sub-frames after the grant. For example, the temporary TDD band 24 may follow the same rule as the FDD band 22. Accordingly, for example, a grant received in sub-frame at index 9 may be applied to an uplink sub-frame at index 3. However, the temporary TDD band 24 may not be able to schedule an uplink transmission in, for example, the sub-frame at index 2 because the sub-frame at index 8 is an uplink sub-frame.

FIG. 4 shows a block diagram 400 conceptually illustrating another example of a reference configuration for uplink scheduling and HARQ timing in flexible duplex. As discussed above, FDD downlink band 22 may be configured for only downlink sub-frames. The temporary TDD band 24 may be configured with a reference configuration 406, which may correspond to, for example, TDD frame configuration 6 in Table 1. Uplink transmissions (e.g., for a physical uplink shared channel (PUSCH) may be scheduled by a grant received in a downlink sub-frame on either the FDD downlink band 22 or the temporary TDD band 24. As above, grants received on the FDD band may be applied to an uplink sub-frame that is a fixed number of sub-frames after the grant. In another aspect, grants received on the TDD band may be applied to an uplink sub-frame based on the reference configuration. For example, the reference configuration 406 may apply a grant received in the downlink sub-frame at index 9 to the uplink sub-frame at index 4.

Figure 5:
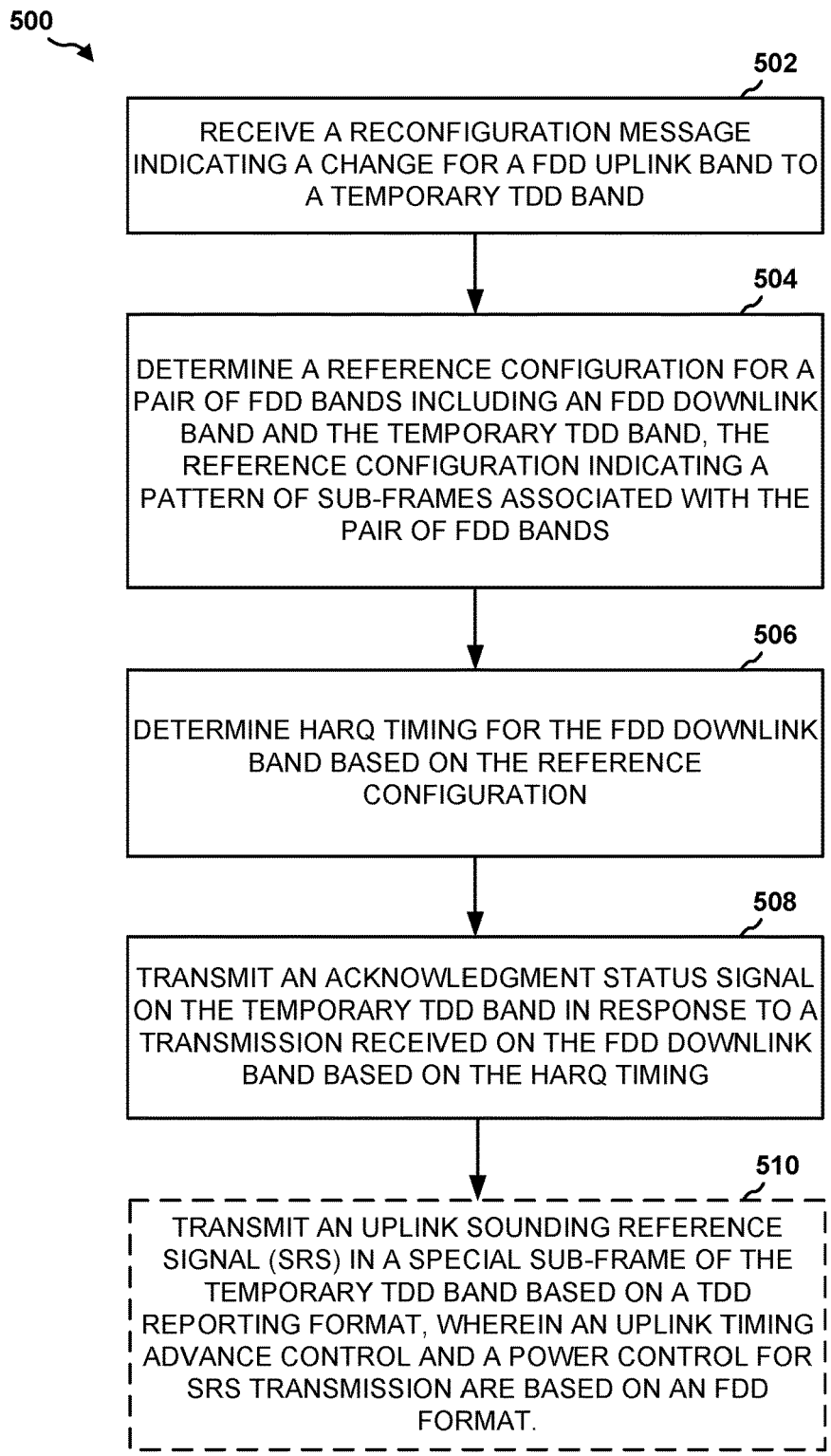
FIG. 5 is a flowchart illustrating an example of a method of downlink HARQ in flexible duplex.

FIG. 5 is a flowchart illustrating an example of a method 500 of downlink HARQ in flexible duplex. In an operational aspect, a UE such as UE 12 (FIG. 1) may perform one aspect of a method 500 for downlink HARQ in flexible duplex. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 502, the method 500 may include receiving a reconfiguration message indicating a change for an FDD uplink band to a temporary TDD band. In an aspect, for example, the receiver 32 may receive the reconfiguration message from the eNB 14 indicating the change for the FDD uplink band to the temporary TDD band 24. The receiver 32 may pass the reconfiguration message to the flexible duplex component 40.

In block 504, the method 500 may include determining a reference configuration for a pair of FDD bands including an FDD downlink band and the temporary TDD band, the reference configuration indicating a pattern of sub-frames associated with the pair of FDD bands. In an aspect, for example, the reference configuration component 42 may determine the reference configuration (e.g., reference configuration 206, 306, 406) for the pair of FDD bands including the FDD downlink band 22 and the temporary TDD band 24. The reference configuration may indicate a pattern of sub-frames associated with the pair of FDD bands.

In block 506, the method 500 may include determining HARQ timing for the FDD downlink band based on the reference configuration. In an aspect, for example, the HARQ timing component 44 may determine the HARQ timing for the FDD downlink band 22 based on the reference configuration. Determining the HARQ timing may include determining an uplink sub-frame of the temporary TDD band 24 in which to transmit the acknowledgment status signal based on the reference configuration.

In block 508, the method 500 may include transmitting an acknowledgment status signal on the temporary TDD band in response to a transmission received on the FDD downlink band based on the HARQ timing, wherein the acknowledgment status signal is an ACK signal or a NACK signal. In an aspect, for example, the transmitter 34 may transmit the acknowledgment status signal on the temporary TDD band in response to the transmission received on the FDD downlink band 22 based on the HARQ timing.

In block 510, the method 500 may optionally include transmitting an uplink sounding reference signal (SRS) in a special sub-frame of the temporary TDD band based on a TDD reporting format, wherein an uplink timing advance control and a power control for SRS transmission are based on an FDD format, e.g., N_TAoffset set to 0 instead of 624 (Ts). In an aspect, for example, the transmitter 34 may transmit the uplink SRS in one or more special sub-frames of the temporary TDD band based on the TDD reporting format. The transmitter 34 may determine the uplink timing advance control and the power control for the SRS transmission based on the FDD format, e.g., N_TAoffset set to 0 instead of 624 (Ts).

Figure 6:
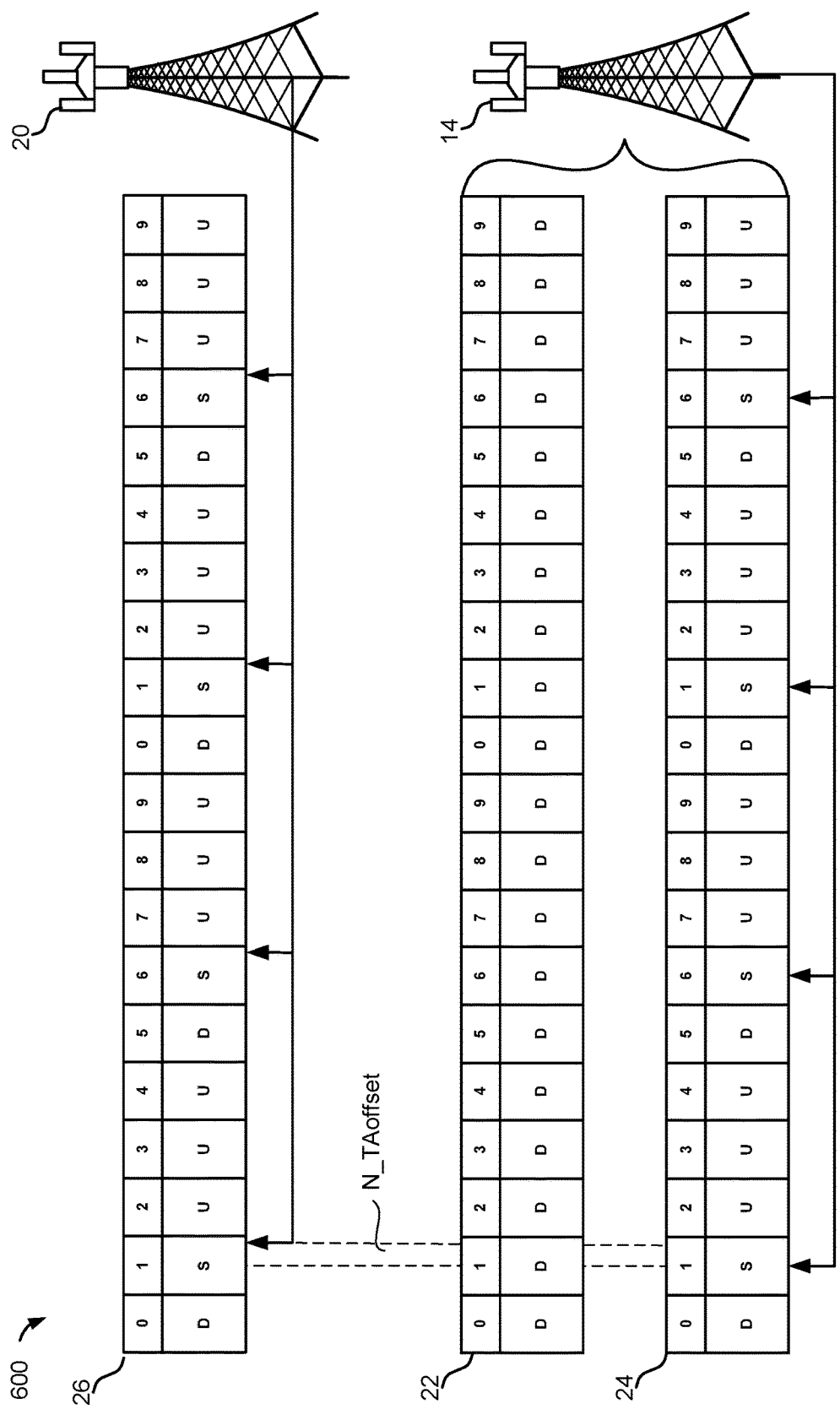
FIG. 6 is block diagram conceptually illustrating an example of sounding reference signal (SRS) transmission in a flexible duplexing scenario.

FIG. 6 shows a block diagram 600 conceptually illustrating transmission of an uplink SRS in flexible duplex. The eNB 20 may provide a primary serving cell (Pcell) on the second frequency band 26, while the eNB 14 provides a secondary serving cell (SCell) using FDD downlink band 22 and temporary TDD band 24. The eNB 20 may use TDD for the second frequency band 26 using, for example, a TDD configuration 0 in Table 1. The UE 12 may transmit the SRS to the eNB 20 in the special sub-frames at indices 1 and 6 in each frame according to a TDD reporting format (e.g., N_TAoffset set to 624 (Ts)). The UE 12 may transmit an SRS to the eNB 14 on the temporary TDD band 24 in the special sub-frames at indices 1 and 6 according to a reference configuration 0 in Table 1. The SRS on the temporary TDD band 24 may use FDD formatting (e.g., N_TAoffset set to 0). Accordingly, the SRS on the temporary TDD band 24 may be transmitted earlier than the SRS on the second frequency band 26 for the primary serving cell configured with TDD. When the temporary TDD band 24 is configured to use FDD, the SRS reporting may also use FDD formatting, so the SRS timing advance on FDD uplink band 24 may not change when reconfigured as temporary TDD band 24, although the sub-frames used to transmit the SRS may change based on the reference configuration. Transmitting the SRS on the temporary TDD band 24 with FDD timing advance may prevent interference with other UEs, which may continue to use the FDD uplink band 24 with an FDD configuration.

Figure 7:
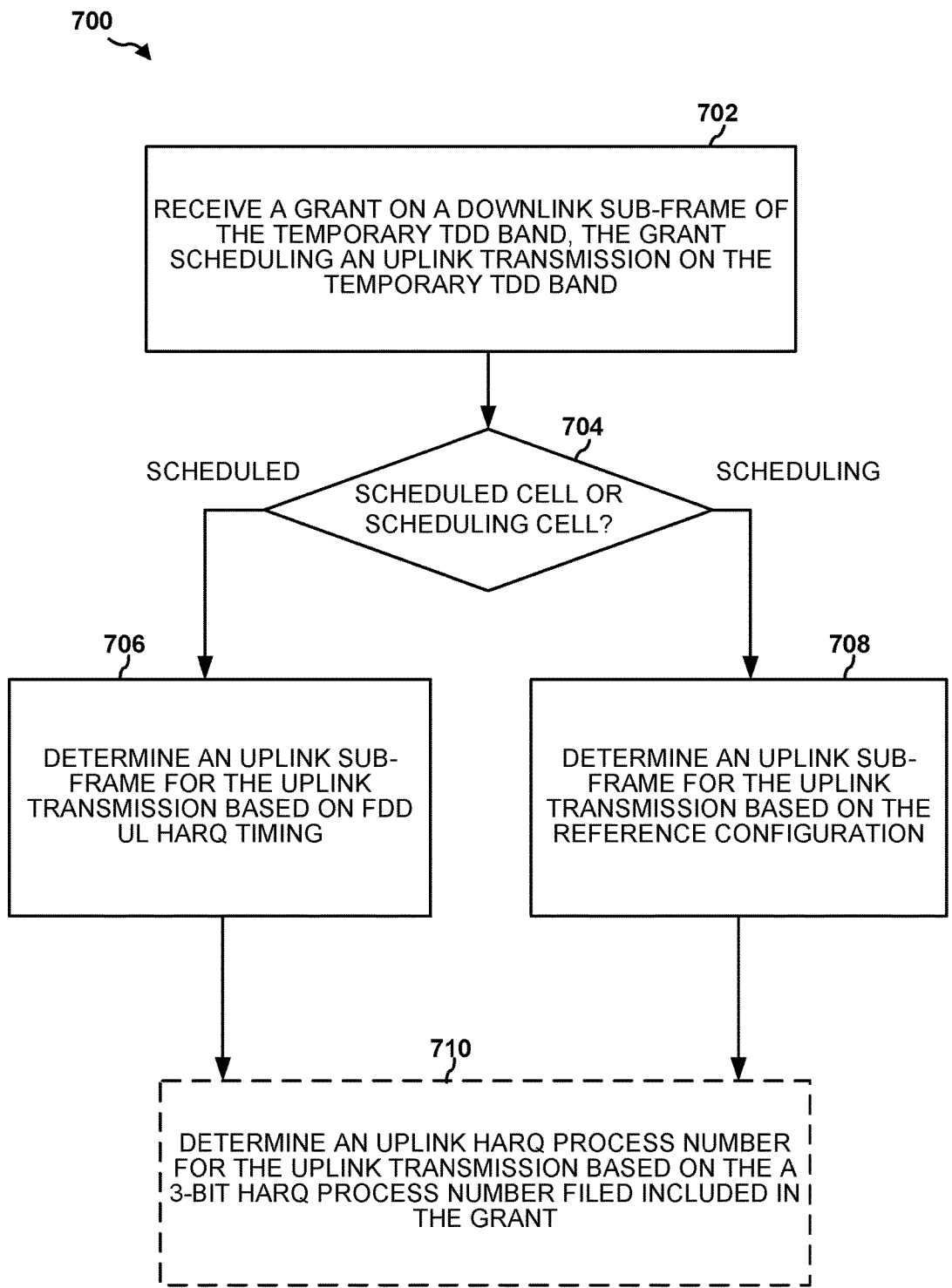
FIG. 7 is a flowchart illustrating an example of a method of uplink HARQ in flexible duplex.

FIG. 7 is a flowchart illustrating an example of a method of uplink scheduling and uplink HARQ in flexible duplex. In an operational aspect, a UE such as UE 12 (FIG. 1) may perform one aspect of a method 700 for uplink scheduling and uplink HARQ in flexible duplex. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 702, the method 700 may include receiving a grant on a downlink sub-frame of the temporary TDD band, the grant scheduling an uplink transmission on the temporary TDD band. In an aspect, for example, the receiver 32 may receive the grant on a downlink sub-frame of the temporary TDD band 24. The grant may schedule an uplink transmission on the temporary TDD band 24. The grant may assign resource elements (RE), a modulation and coding scheme (MCS), and/or a waveform, to the UE 12 to use for an uplink transmission during one or more sub-frames. The grant may also include a 3-bit HARQ process number.

In block 704, the method 700 may include determining whether the UE 12 is configured to determine uplink scheduling based on a scheduled cell or based on a scheduling cell. If the UE 12 is configured to determine uplink scheduling based on the scheduled cell, the method 700 may proceed to block 706. If the UE 12 is configured to determine uplink scheduling based on the scheduling cell, the method 700 may proceed to block 708.

In block 706, the method 700 may include determining an uplink sub-frame for the uplink transmission based on FDD uplink HARQ timing. In an aspect, for example, the uplink scheduler 46 may determine the uplink sub-frame for the uplink transmission based on the FDD uplink HARQ timing. In an aspect, the FDD uplink HARQ timing may be a fixed timing after receipt of the grant. For example, the uplink scheduler 46 may determine the uplink sub-frame to be 4 sub-frames after receipt of the grant.

In block 708, the method 700 may include determining an uplink sub-frame for the uplink transmission based on the reference configuration. In an aspect, for example, the uplink scheduler 46 may determine the uplink sub-frame for the uplink transmission based on the reference configuration 406. The reference configuration 406 may correspond to a TDD UL-DL configuration. In an aspect, the reference configuration 406 may define a downlink sub-frame for receiving a grant for each uplink sub-frame, or vice-versa, define an uplink sub-frame in which to apply a grant received in each downlink sub-frame. In an aspect, the receiver 32 may monitor for a grant in the designated downlink sub-frames.

In block 710, the method 700 may optionally include determining an uplink HARQ process number for the uplink transmission based on a 3-bit HARQ process number included in the grant. In an aspect, for example, the HARQ timing component 44 may determine the HARQ process number based on the 3-bit HARQ process number included in the grant.

Figure 8:
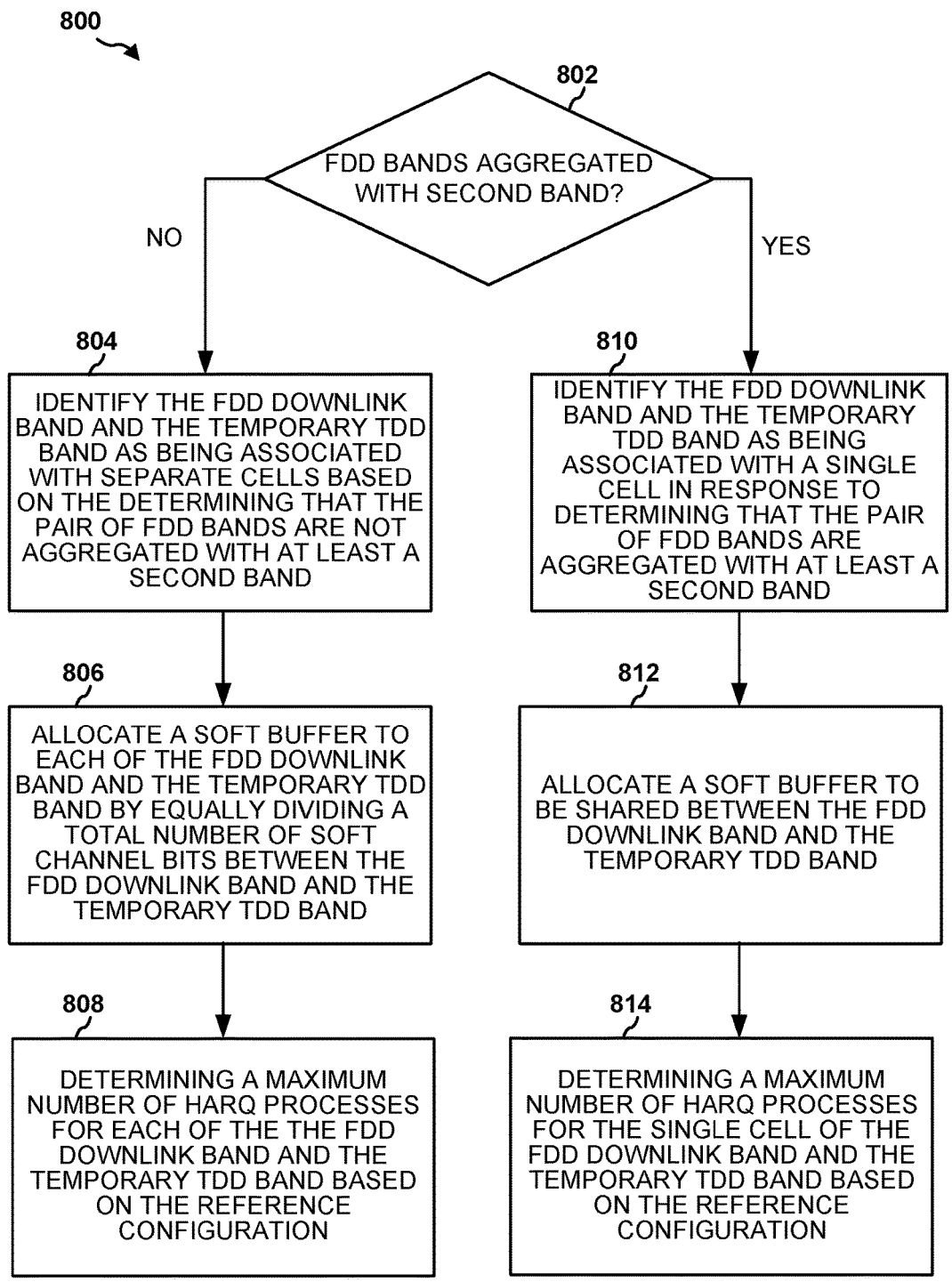
FIG. 8 is a flowchart illustrating an example of a method of soft buffer management in flexible duplex.
Figure 17:
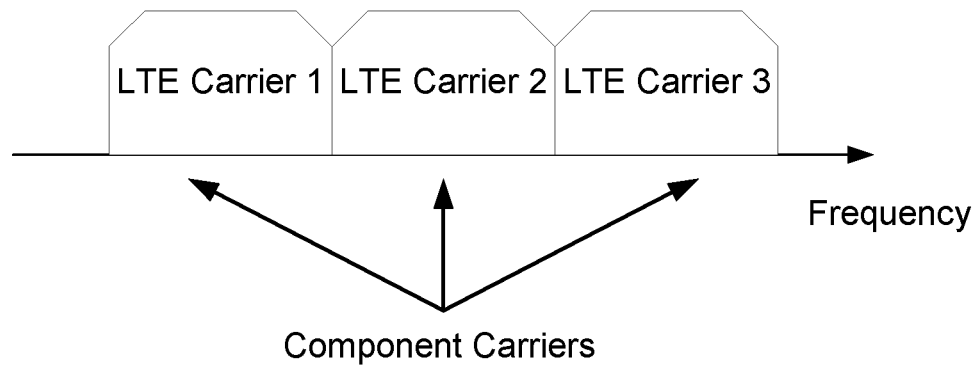
FIG. 17 is a diagram illustrating a continuous carrier aggregation type in accordance with an aspect of the present disclosure.
Figure 18:
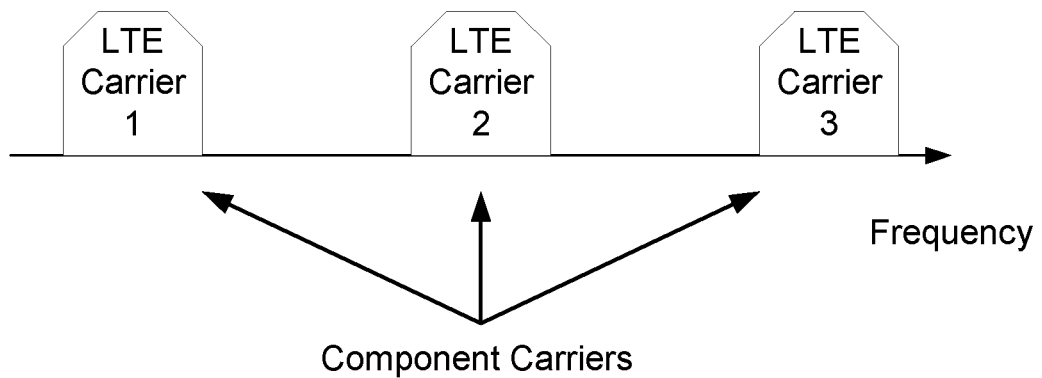
FIG. 18 is a diagram illustrating a non-continuous carrier aggregation type in accordance with an aspect of the present disclosure.

FIG. 8 is a flowchart illustrating an example of a method of soft buffer management in flexible duplex based on carrier aggregation techniques. Using carrier aggregation, UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA, which are illustrated in FIGS. 17 and 18, respectively. Continuous CA occurs when multiple available component carriers are adjacent to each other (as illustrated in FIG. 17). On the other hand, non-continuous CA occurs when multiple non-adjacent available component carriers are separated along the frequency band (as illustrated in FIG. 18). Both non-continuous and continuous CA may aggregate multiple component carriers to serve a single unit of LTE-Advanced UEs. In various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support may be referred to as "associated secondary carriers." For example, the UE may aggregate control functions such as those provided by the optional dedicated channel (DCH), the nonscheduled grants, a physical uplink control channel (PUCCH), and/or a physical downlink control channel (PDCCH).

HARQ processes may be used to manage the soft buffer size. Generally, for each sub-frame where a transmission takes place for the HARQ process, one or two (in case of downlink spatial multiplexing) transport blocks (TB) and the associated HARQ information may be received from the HARQ entity. Depending on whether the transmission is a new transmission or an old transmission, the UE 12 may store or combine the received TB with old log likelihood ratios (LLR) in the soft buffer. Depending on the decoding results, UE sends an ACK or NACK. For both FDD and TDD, if the UE is configured with more than one serving cell, then for each serving cell, for at least $K_{MIMO}$·min $(M_{DL\_HARQ}, M_{limit})$ transport blocks, where $M_{DL\_HARQ}$ is the maximum number of DL HARQ processes, upon decoding failure of a code block of a transport block, the UE shall store received soft channel bits corresponding to a range of at least $w_k, w_{k+1}, \ldots, w_{mod(k+n_{SB}-1,N_{cb})}$, where $$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right).$$

$K_{MIMO}$ is the MIMO rank. $M_{limit}$ is the soft buffer size in transport blocks. $N'_{soft}$ is the total number of soft channel bits according to the UE category. $N_{cells}^{DL}$ is the number of configured serving cells. $N_{cb}$ is the soft buffer size in number of bits for the r-th code block. $w_k$ corresponds to a received soft channel bit. In other words the soft buffer may be equally divided among all configured serving cells and for each serving cell the soft buffer management is based on a maximum of 8 DL HARQ processes. There is potential resource collision for more than 8 HARQ processes. Because flexible duplex increases the number of downlink sub-frames and because TDD may use more HARQ processes than FDD, flexible duplex may use more than 8 HARQ processes for both FDD downlink band and the temporary TDD band. For example, if the UE 12 is configured with flexible duplex and spatial multiplexing, the maximum number of DL HARQ processes per cell (DL+UL for DL transmissions) can be up to 31, which may strain the soft buffer.

In an aspect, carrier aggregation techniques may be used to manage the soft buffer in flexible duplex. With carrier aggregation, soft buffer resources may be evenly divided among component carriers. Generally, for flexible duplex, if an FDD band configured with flexible duplex is not already aggregated with another carrier, the FDD downlink band and the temporary TDD band may be treated as separate cells or carriers using carrier aggregation. If the FDD band configured with flexible duplex is already aggregated with another carrier, the FDD downlink band and the temporary TDD band may be treated as a single cell for soft buffer management.

Referring to FIG. 8, in an aspect, the method 800 may be performed by a UE 12. As such, method 800 may be performed concurrently with the method 500 described above. For example, in an operational aspect, the UE 12 (FIG. 1) may perform one aspect of a method 800 for soft buffer management while simultaneously performing method 500 for downlink HARQ. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 802, the method 800 may include determining whether the pair of FDD bands is aggregated with at least one second band. If the pair of FDD bands is not aggregated with at least one second band, the method 800 may proceed to block 804. If the pair of FDD bands is aggregated with at least one second band, the method 800 may proceed to block 810.

In block 804, the method 800 may include identifying the FDD downlink band and the temporary TDD band as being associated with separate cells based on the determining that the pair of FDD bands is not aggregated with at least a second band. In an aspect, for example, the modem 108 may identify the FDD downlink band and the temporary TDD band as being associated with separate cells based on the determining that the pair of FDD bands is not aggregated with at least a second band.

In block 806, the method 800 may include allocating a soft buffer to each of the FDD downlink band and the temporary TDD band by equally dividing total number of soft channel bits between the FDD downlink band and the temporary TDD band. In an aspect, for example, the soft buffer component 48 may allocate a soft buffer to each of the FDD downlink band and the temporary TDD band by equally dividing a total number of soft channel bits between the FDD downlink band and the temporary TDD band. The total number of soft channel bits may be, for example, based on a physical memory size for a soft buffer or a number of bits allocated for the soft buffer.

In block 808, the method 800 may include determining a maximum number of HARQ processes for both the FDD downlink band and the temporary TDD band based on the reference configuration, wherein the maximum number of HARQ processes is used for soft buffer management in each separate cell. In an aspect, for example, the soft buffer component 48 may determine the maximum number of HARQ processes for both the FDD downlink band 22 and the temporary TDD band 24 based on the reference configuration.

In block 810, the method 800 may include identifying the FDD downlink band and the temporary TDD band as being associated with a single cell in response to determining that the pair of FDD bands is aggregated with at least one second band. In an aspect, for example, the modem 108 may identify the FDD downlink band and the temporary TDD band as being associated with the single cell in response to determining that the pair of FDD bands is aggregated with at least one second band.

In block 812, the method 800 may include allocating a soft buffer to be shared between the FDD downlink band and the temporary TDD band. In an aspect, for example, the soft buffer component 48 may allocate a soft buffer to be shared between the FDD downlink band and the temporary TDD band. The soft buffer may be the same size as a soft buffer allocated to the at least one second band.

In block 814, the method 800 may include determining a maximum number of HARQ processes for the single cell of the FDD downlink band and the temporary TDD band based on the reference configuration, wherein the maximum number of HARQ processes is used for soft buffer management. In an aspect, for example, the soft buffer component 48 may determine a maximum number of HARQ processes for the single cell of the FDD downlink band and the temporary TDD band based on the reference configuration. In an aspect, because the HARQ processes are shared between the FDD downlink band 22 and the temporary TDD band 24, the UE 12 may receive a downlink transmission either on the FDD downlink band or on the temporary TDD band but not simultaneously.

Figure 9:
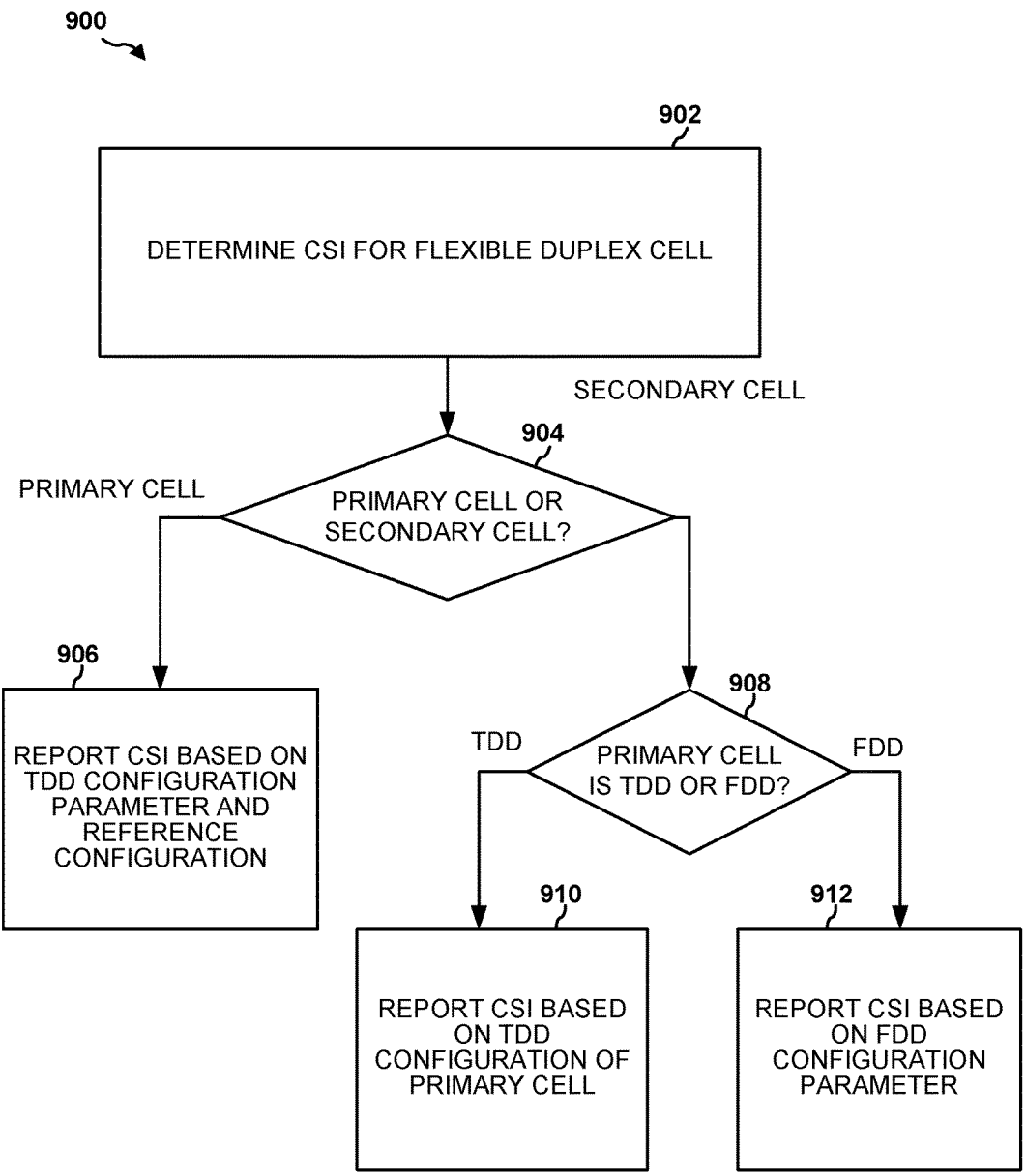
FIG. 9 is a flowchart illustrating an example of a method of channel state information (CSI) reporting in a flexible duplex scenario.

FIG. 9 is a flowchart illustrating an example of a method of CSI reporting. In an operational aspect, a UE such as UE 12 (FIG. 1) may perform one aspect of a method 900 for CSI reporting. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 902, the method 900 may include determining a CSI for a flexible duplex cell (e.g., eNB 14 in FIG. 1). In an aspect, for example, the RF Front End 104 and/or transceiver 106 may determine the CSI. In block 904, the method 900 may include determining whether the FDD downlink band 22 (FIG. 1) is associated with a primary cell or secondary cell. If the FDD downlink band 22 is associated with a primary cell, in block 906, the method 900 may include transmitting a periodic CSI report based on a TDD reporting format. For example, the TDD configuration parameter may be a CSI reporting periodicity. If the FDD downlink band 22 is associated with a secondary cell, in block 908, the method 900 may transmitting a periodic CSI report based on a CSI reporting format of the primary cell, which may be either a TDD configuration or an FDD configuration. In block 910, if the primary cell configuration is TDD, the method 900 may include transmitting a periodic CSI report based on a TDD configuration of the primary cell. In block 912, if the primary cell configuration is FDD, the method 900 may include transmitting a periodic CSI report based on an FDD configuration parameter. For example, the FDD configuration parameter may be a CSI reporting periodicity, which may be lower (e.g., 5 ms, 2 ms, or 1 ms) for FDD than for TDD.

Figure 10:
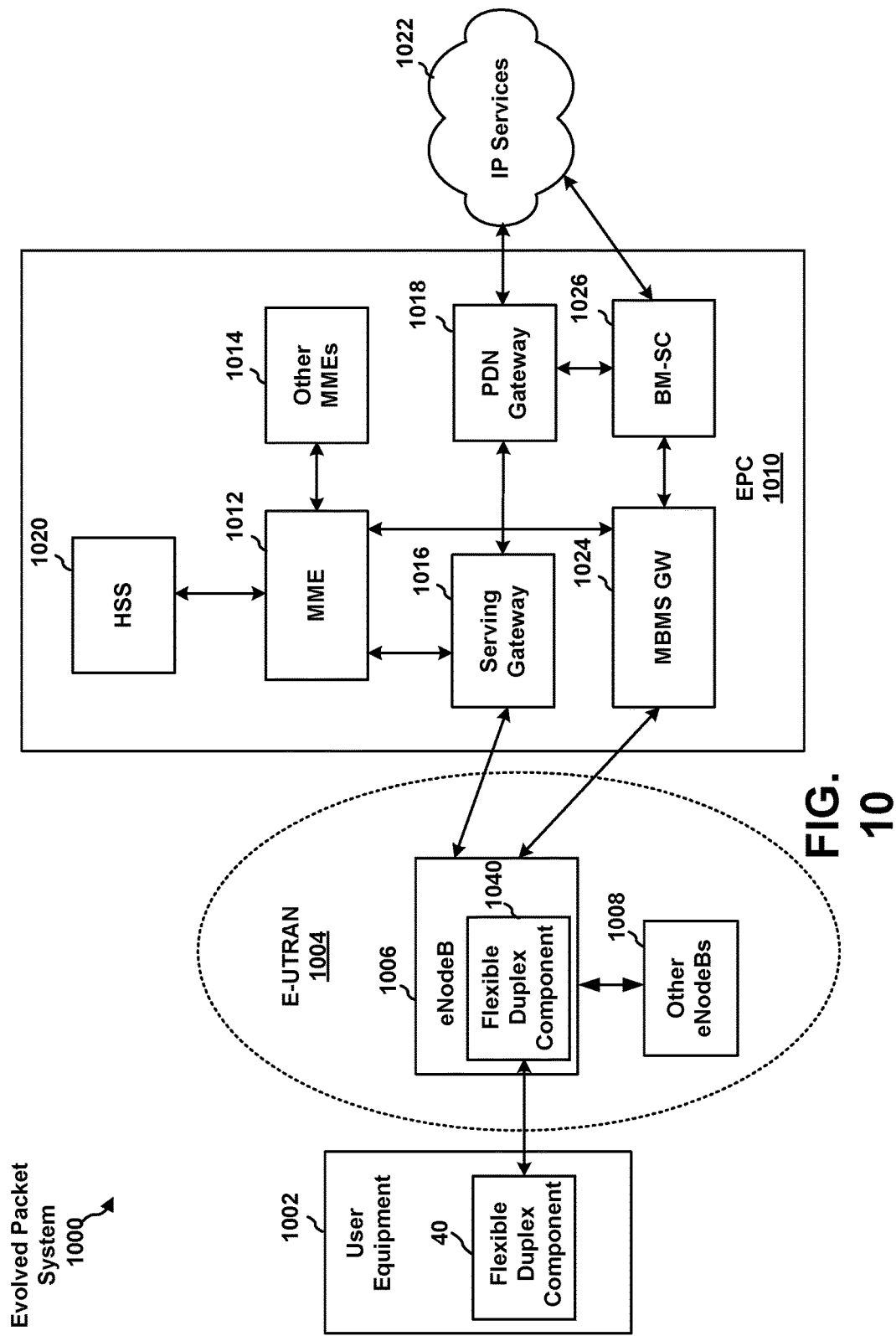
FIG. 10 is a diagram illustrating an example of a network architecture.

FIG. 10 is a diagram illustrating an LTE network architecture 1000 including one or more UEs 1002 having a flexible duplex component 40 as described herein for implementing a flexible duplex design. The LTE network architecture 1000 may be referred to as an Evolved Packet System (EPS) 1000. The EPS 1000 may include one or more user equipment (UE) 1002, an Evolved UMTS Terrestrial Radio Access Network (E-UTRAN) 1004, an Evolved Packet Core (EPC) 1010, and an Operator's Internet Protocol (IP) Services 1022. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 1006 and other eNBs 1008, each of which may be an example of the eNB 14 or eNB 20 (FIG. 1). The eNB 1006 provides user and control planes protocol terminations toward the UE 1002. The eNB 1006 may be connected to the other eNBs 1008 via a backhaul (e.g., an X2 interface). The eNB 1006 may also be referred to as a base station, a Node B, an access point, a base transceiver station, a radio base station, a radio transceiver, a transceiver function, a basic service set (BSS), an extended service set (ESS), or some other suitable terminology. The eNB 1006 provides an access point to the EPC 1010 for the UE 1002.

In an aspect, the eNB 1006 may include a flexible duplex component 1040, which may correspond to the flexible duplex component 40 in the UE 1002. The flexible duplex component 1040 may include hardware, firmware, and/or software code executable by a processor for providing a flexible duplex design from the eNB side, the code comprising instructions and being stored in a memory (e.g., computer-readable medium. For example, the flexible duplex component 1040 may transmit a reconfiguration message to change the FDD uplink band to the temporary TDD band. The flexible duplex component 1040 may also determine the reference configuration to be used by the UE 1002. The flexible duplex component 1040 may also determine HARQ timing based on the reference configuration for sending and receiving status acknowledgments and grants. The flexible duplex component 1040 may also determine formatting according to the same rules as the flexible duplex component 40 so that messages may be interpreted unambiguously. In an aspect, the eNB 1006 may include a processor, modem, memory, transceiver, RF front end, and antenna arranged in a similar manner to that illustrated in FIG. 1 with respect to UE 12 with the flexible duplex component 1040 replacing the flexible duplex component 40.

The eNB 1006 is connected to the EPC 1010. The EPC 1010 may include a Mobility Management Entity (MME) 1012, a Home Subscriber Server (HSS) 1020, other MMES 1014, a Serving Gateway 1016, a Multimedia Broadcast Multicast Service (MBMS) Gateway 1024, a Broadcast Multicast Service Center (BM-SC) 1026, and a Packet Data Network (PDN) Gateway 1018. The MME 1012 is the control node that processes the signaling between the UE 1002 and the EPC 1010. Generally, the MME 1012 provides bearer and connection management. All user IP packets are transferred through the Serving Gateway 1016, which itself is connected to the PDN Gateway 1018. The PDN Gateway 1018 provides UE IP address allocation as well as other functions. The PDN Gateway 1018 and the BM-SC 1026 are connected to the IP Services 1022. The IP Services 1022 may include the Internet, an intranet, an IP Multimedia Subsystem (IMS), a PS Streaming Service (PSS), and/or other IP services. The BM-SC 1026 may provide functions for MBMS user service provisioning and delivery. The BM-SC 1026 may serve as an entry point for content provider MBMS transmission, may be used to authorize and initiate MBMS Bearer Services within a PLMN, and may be used to schedule and deliver MBMS transmissions. The MBMS Gateway 1024 may be used to distribute MBMS traffic to the eNBs (e.g., 1006, 1008) belonging to a Multicast Broadcast Single Frequency Network (MBSFN) area broadcasting a particular service, and may be responsible for session management (start/stop) and for collecting evolved MSMS (eMBMS) related charging information.

Figure 11:
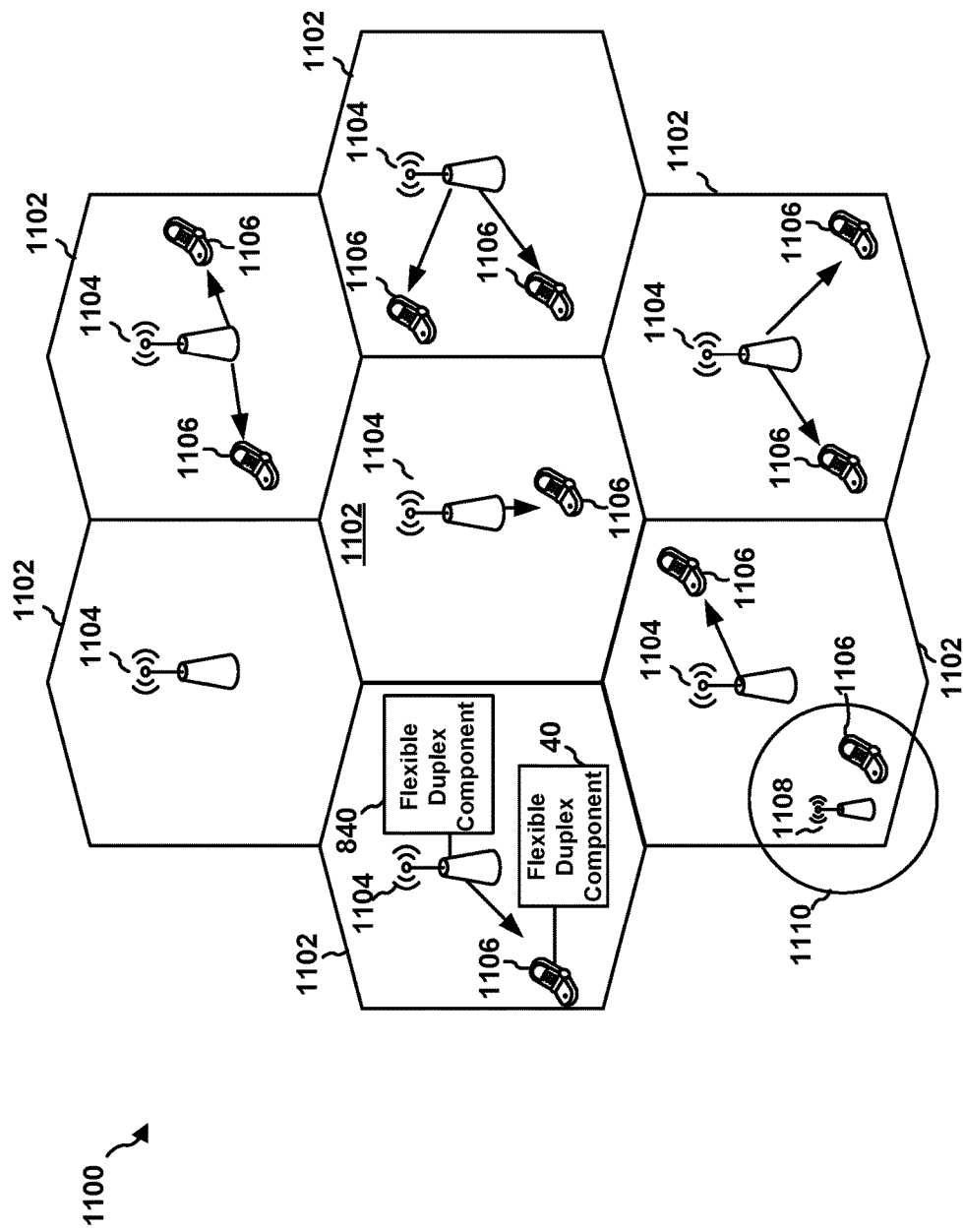
FIG. 11 is a diagram illustrating an example of an access network.

FIG. 11 is a diagram illustrating an example of an access network 1100 in an LTE network architecture. In this example, the access network 1100 is divided into a number of cellular regions (cells) 1102. One or more lower power class eNBs 1108 may have cellular regions 1110 that overlap with one or more of the cells 1102. The lower power class eNB 1108 may be a femto cell (e.g., home eNB (HeNB)), pico cell, micro cell, or remote radio head (RRH). The macro eNBs 1104 are each assigned to a respective cell 1102 and are configured to provide an access point to the EPC 1010 for all the UEs 1106 in the cells 1102. Each of the UEs 1106 may be an example of the UE 12 (FIG. 1) or UE 1002 (FIG. 10) and include a flexible duplex component 40. Each of the macro eNBs 1104 and the lower power class eNBs 1108 may be an example of the eNB 14 or eNB 1006 and include a flexible duplex component 1040 for implementing network-side aspects of a flexible duplex design for communication with a UE 1106 including a flexible duplex component 40. There is no centralized controller in this example of an access network 1100, but a centralized controller may be used in alternative configurations. The eNBs 1104 are responsible for all radio related functions including radio bearer control, admission control, mobility control, scheduling, security, and connectivity to the serving gateway 1016. An eNB may support one or multiple (e.g., three) cells (also referred to as sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 1100 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1104 may have multiple antennas supporting MIMO technology. The use of MIMO technology enables the eNBs 1104 to exploit the spatial domain to support spatial multiplexing, beamforming, and transmit diversity. Spatial multiplexing may be used to transmit different streams of data simultaneously on the same frequency. The data streams may be transmitted to a single UE 1106 to increase the data rate or to multiple UEs 1106 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 1106 with different spatial signatures, which enables each of the UE(s) 1106 to recover the one or more data streams destined for that UE 1106. On the UL, each UE 1106 transmits a spatially precoded data stream, which enables the eNB 1104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 12:
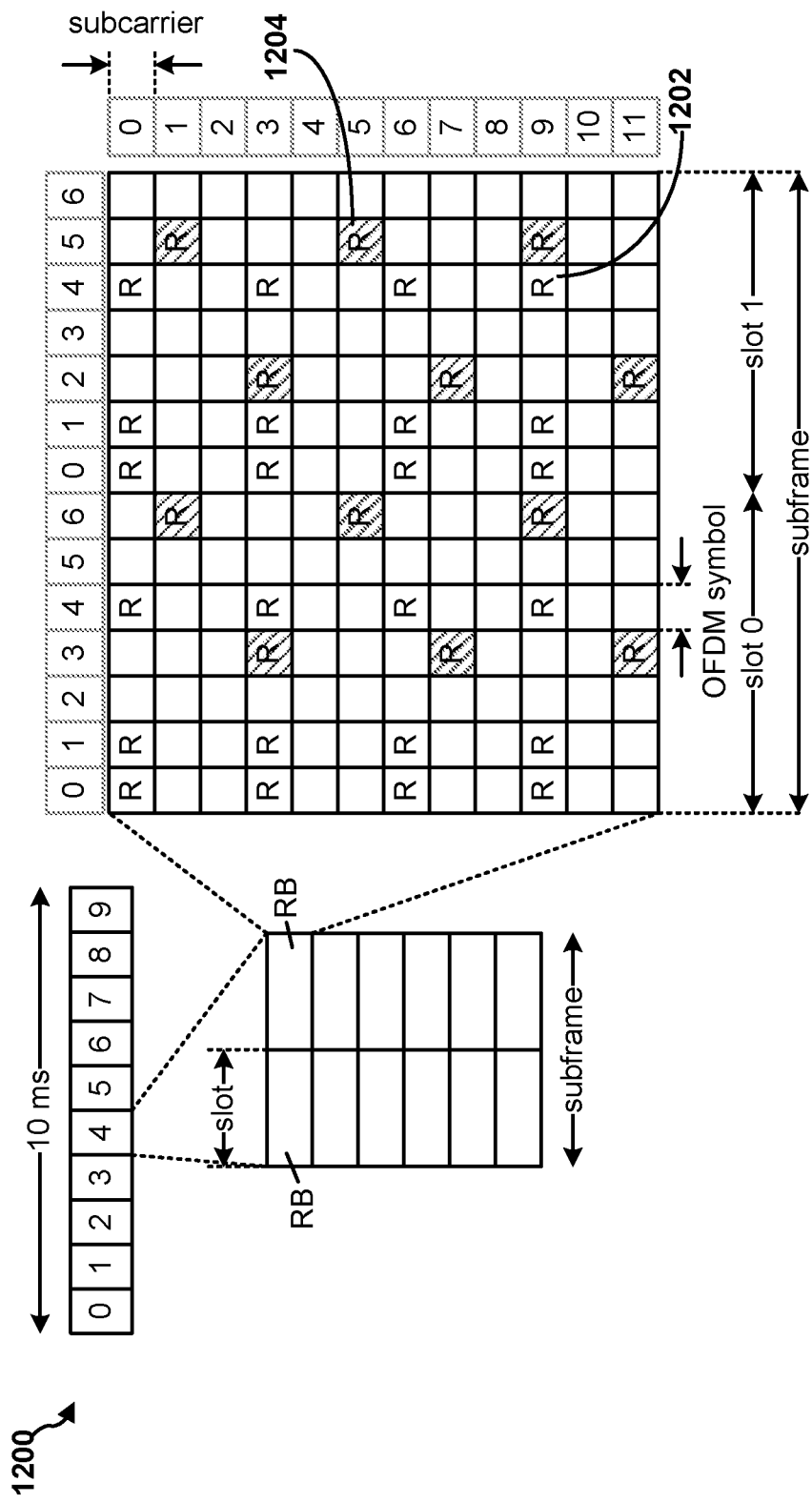
FIG. 12 is a diagram illustrating an example of a DL frame structure in LTE.

FIG. 12 is a diagram 1200 illustrating an example of a DL frame structure in LTE. A frame (10 ms) may be divided into 10 equally sized sub-frames. Each sub-frame may include two consecutive time slots. FIG. 12 may provide further details of resource allocation for any of the downlink sub-frames illustrated in FIGS. 2, 3, and 4. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 1202, 1204, include DL reference signals (DL-RS). The DL-RS include Cell-specific RS (CRS) (also sometimes called common RS) 1202 and UE-specific RS (UE-RS) 1204. UE-RS 1204 are transmitted on the resource blocks upon which the corresponding physical DL shared channel (PDSCH) is mapped. Further, the PDCCH may be mapped to resource blocks in the first 3 or 4 OFDM symbols of the sub-frame and provide information for decoding the remaining resource elements as well as grants for uplink transmissions. The number of bits carried by each resource element depends on the modulation scheme. Thus, the more resource blocks that a UE receives and the higher the modulation scheme, the higher the data rate for the UE.

Figure 13:
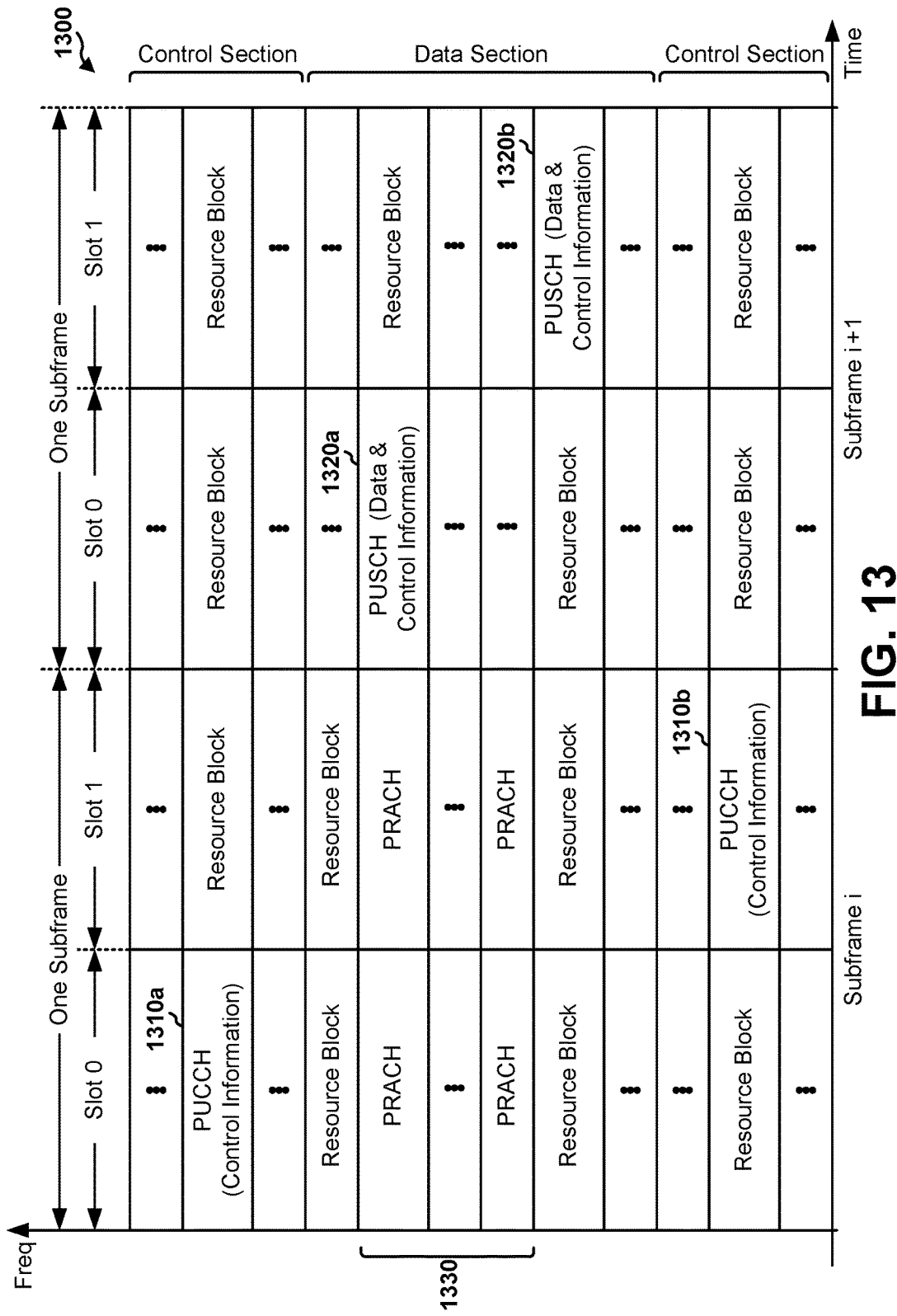
FIG. 13 is a diagram illustrating an example of an UL frame structure in LTE.

FIG. 13 is a diagram 1300 illustrating an example of an UL frame structure in LTE. FIG. 13 may provide further details of resource allocation for any of the uplink sub-frames illustrated in FIGS. 2, 3, and 4. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1310*a*, 1310*b* in the control section to transmit control information to an eNB. The UE may also be assigned resource blocks 1320*a*, 1320*b* in the data section to transmit data to the eNB. The UE may transmit control information in a physical UL control channel (PUCCH) on the assigned resource blocks in the control section. For example, the PUCCH may include the HARQ acknowledgment status messages. The UE may transmit data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 1330. The PRACH 1330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single sub-frame (1 ms) or in a sequence of few contiguous sub-frames and a UE can make a single PRACH attempt per frame (10 ms).

Figure 14:
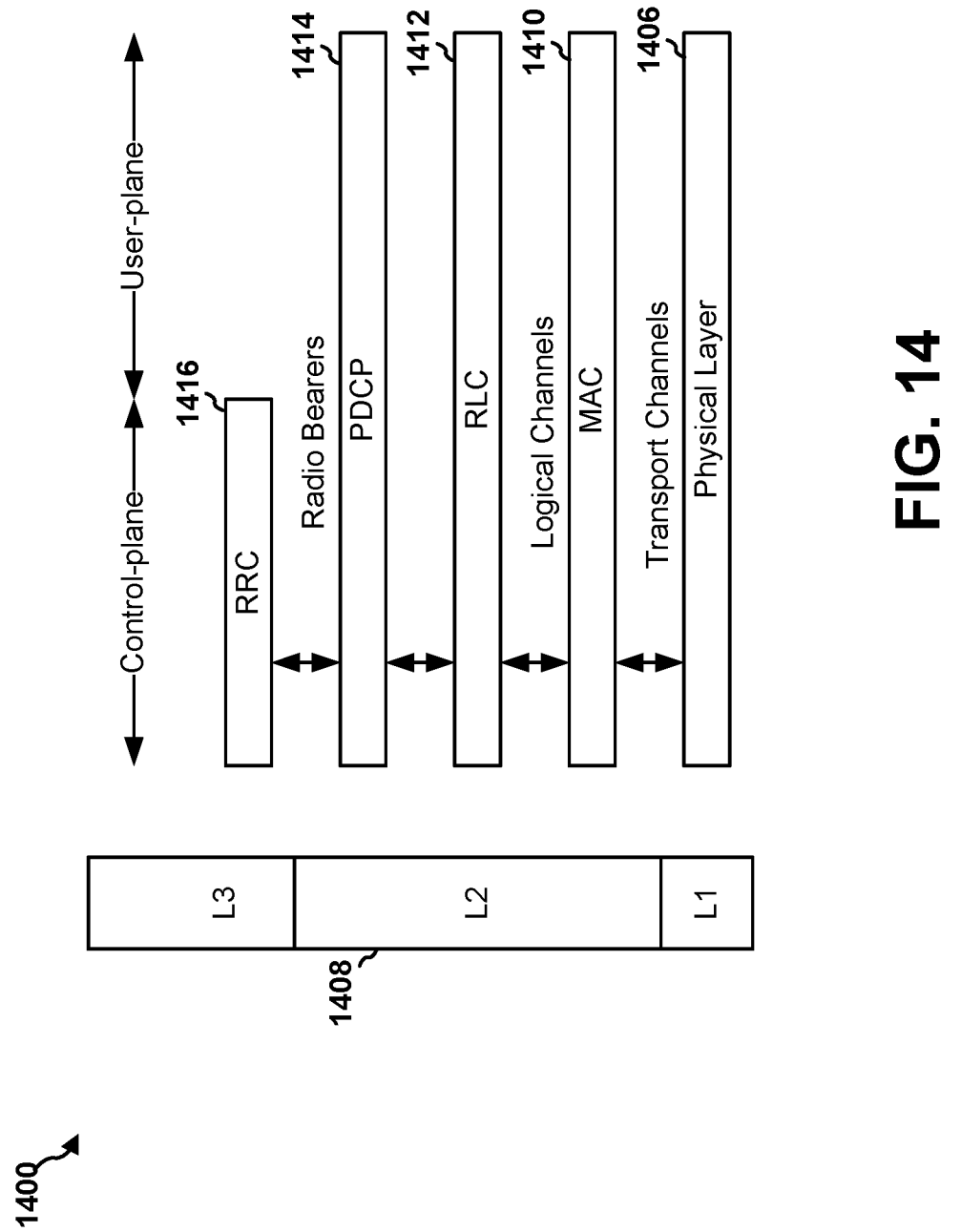
FIG. 14 is a diagram illustrating an example of a radio protocol architecture for the user and control planes.

FIG. 14 is a diagram 1400 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 1406. Layer 2 (L2 layer) 1408 is above the physical layer 1406 and is responsible for the link between the UE and eNB over the physical layer 1406. The above described flexible duplex design may primarily affect the physical layer 1406. Signaling (e.g., to transition between FDD uplink band to a temporary TDD downlink band, or change reference frame configuration, may be carried out at the RRC sublayer 1416.

In the user plane, the L2 layer 1408 includes a media access control (MAC) sublayer 1410, a radio link control (RLC) sublayer 1412, and a packet data convergence protocol (PDCP) 1414 sublayer, which are terminated at the eNB on the network side. Although not shown, the UE may have several upper layers above the L2 layer 1408 including a network layer (e.g., IP layer) that is terminated at the PDN gateway 1418 on the network side, and an application layer that is terminated at the other end of the connection (e.g., far end UE, server, etc.).

The PDCP sublayer 1414 provides multiplexing between different radio bearers and logical channels. The PDCP sublayer 1414 also provides header compression for upper layer data packets to reduce radio transmission overhead, security by ciphering the data packets, and handover support for UEs between eNBs. The RLC sublayer 1412 provides segmentation and reassembly of upper layer data packets, retransmission of lost data packets, and reordering of data packets to compensate for out-of-order reception due to hybrid automatic repeat request (HARQ). The MAC sublayer 1410 provides multiplexing between logical and transport channels. The MAC sublayer 1410 is also responsible for allocating the various radio resources (e.g., resource blocks) in one cell among the UEs. The MAC sublayer 1410 is also responsible for HARQ operations.

In the control plane, the radio protocol architecture for the UE and eNB is substantially the same for the physical layer 1406 and the L2 layer 1408 with the exception that there is no header compression function for the control plane. The control plane also includes a radio resource control (RRC) sublayer 1416 in Layer 3 (L3 layer). The RRC sublayer 1416 is responsible for obtaining radio resources (e.g., radio bearers) and for configuring the lower layers using RRC signaling between the eNB and the UE. For example, the RRC sublayer 1416 may provide signaling for reconfiguring an FDD uplink band to temporarily use TDD, or vice versa.

Figure 15:
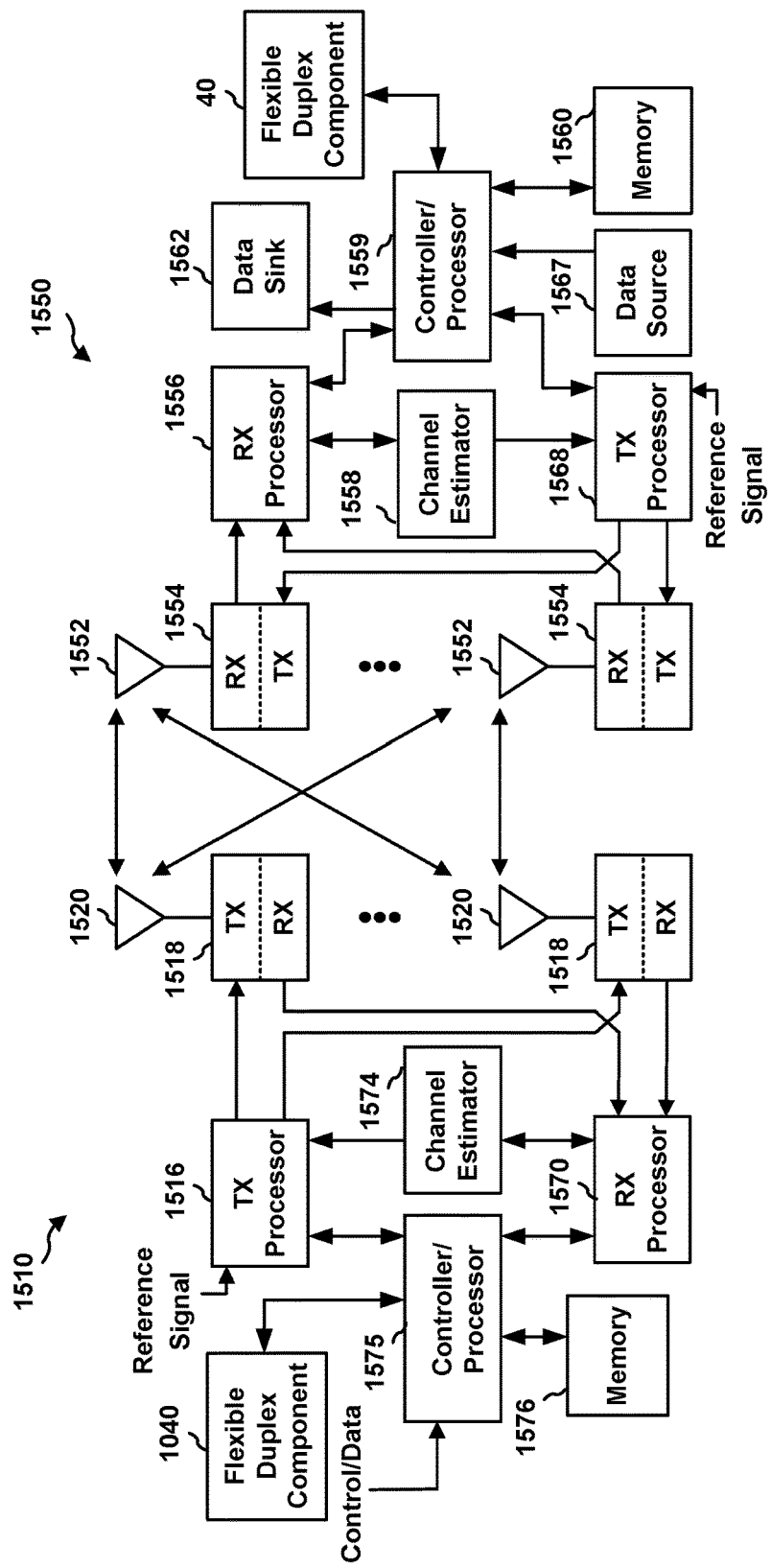
FIG. 15 is a diagram illustrating an example of an evolved Node B and user equipment in an access network.

FIG. 15 is a block diagram of an eNB 1510 in communication with a UE 1550 in an access network. In the DL, upper layer packets from the core network are provided to a controller/processor 1575. The controller/processor 1575 implements the functionality of the L2 layer. In the DL, the controller/processor 1575 provides header compression, ciphering, packet segmentation and reordering, multiplexing between logical and transport channels, and radio resource allocations to the UE 1550 based on various priority metrics. The controller/processor 1575 is also responsible for HARQ operations, retransmission of lost packets, and signaling to the UE 1550. In an aspect, the flexible duplex component 1040 may communicate with the controller/processor for implementing eNB side flexible duplexing.

The transmit (TX) processor 1516 implements various signal processing functions for the L1 layer (i.e., physical layer). The signal processing functions include coding and interleaving to facilitate forward error correction (FEC) at the UE 1550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1574 may be used to determine the coding and modulation scheme, as well as for spatial processing. The channel estimate may be derived from a reference signal and/or channel condition feedback transmitted by the UE 1550. Each spatial stream may then be provided to a different antenna 1520 via a separate transmitter 1518TX. Each transmitter 1518TX may modulate an RF carrier with a respective spatial stream for transmission.

At the UE 1550, each receiver 1554RX receives a signal through its respective antenna 1552. Each receiver 1554RX recovers information modulated onto an RF carrier and provides the information to the receive (RX) processor 1556. The RX processor 1556 implements various signal processing functions of the L1 layer. The RX processor 1556 may perform spatial processing on the information to recover any spatial streams destined for the UE 1550. If multiple spatial streams are destined for the UE 1550, they may be combined by the RX processor 1556 into a single OFDM symbol stream. The RX processor 1556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 1510. These soft decisions may be based on channel estimates computed by the channel estimator 1558. The soft decisions are then decoded and deinterleaved to recover the data and control signals that were originally transmitted by the eNB 1510 on the physical channel. The data and control signals are then provided to the controller/processor 1559.

The controller/processor 1559 implements the L2 layer. The controller/processor can be associated with a memory 1560 that stores program codes and data. The memory 1560 may be referred to as a computer-readable medium. In the UL, the controller/processor 1559 provides demultiplexing between transport and logical channels, packet reassembly, deciphering, header decompression, control signal processing to recover upper layer packets from the core network. The upper layer packets are then provided to a data sink 1562, which represents all the protocol layers above the L2 layer. Various control signals may also be provided to the data sink 1562 for L3 processing. The controller/processor 1559 is also responsible for error detection using an ACK/NACK protocol to support HARQ operations. In an aspect, the UE 1550 may further include a flexible duplex component 40 for implementing a flexible duplex design as described herein. The flexible duplex component 40 may, for example, provide the controller/processor 1559 with the HARQ timing to support the ACK/NACK protocol. The flexible duplex component 40 may also control the RX processor 1556 to manage the soft buffer.

In the UL, a data source 1567 is used to provide upper layer packets to the controller/processor 1559. The data source 1567 represents all protocol layers above the L2 layer. Similar to the functionality described in connection with the DL transmission by the eNB 1510, the controller/processor 1559 implements the L2 layer for the user plane and the control plane by providing header compression, ciphering, packet segmentation and reordering, and multiplexing between logical and transport channels based on radio resource allocations by the eNB 1510. The controller/processor 1559 is also responsible for HARQ operations, retransmission of lost packets, and signaling to the eNB 1510. The flexible duplex component 40 may provide the HARQ timing and formatting for uplink communications.

Channel estimates derived by a channel estimator 1558 from a reference signal or feedback transmitted by the eNB 1510 may be used by the TX processor 1568 to select the appropriate coding and modulation schemes, and to facilitate spatial processing. The spatial streams generated by the TX processor 1568 may be provided to different antenna 1552 via separate transmitters 1554TX. Each transmitter 1554TX may modulate an RF carrier with a respective spatial stream for transmission.

The UL transmission is processed at the eNB 1510 in a manner similar to that described in connection with the receiver function at the UE 1550. Each receiver 1518RX receives a signal through its respective antenna 1520. Each receiver 1518RX recovers information modulated onto an RF carrier and provides the information to a RX processor 1570. The RX processor 1570 may implement the L1 layer.

The controller/processor 1575 implements the L2 layer. The controller/processor 1575 can be associated with a memory 1576 that stores program codes and data. The memory 1576 may be referred to as a computer-readable medium. In the UL, the controller/processor 1575 provides demultiplexing between transport and logical channels, packet reassembly, deciphering, header decompression, control signal processing to recover upper layer packets from the UE 1550. Upper layer packets from the controller/processor 1575 may be provided to the core network. The controller/processor 1575 is also responsible for error detection using an ACK and/or NACK protocol to support HARQ operations.

Figure 16:
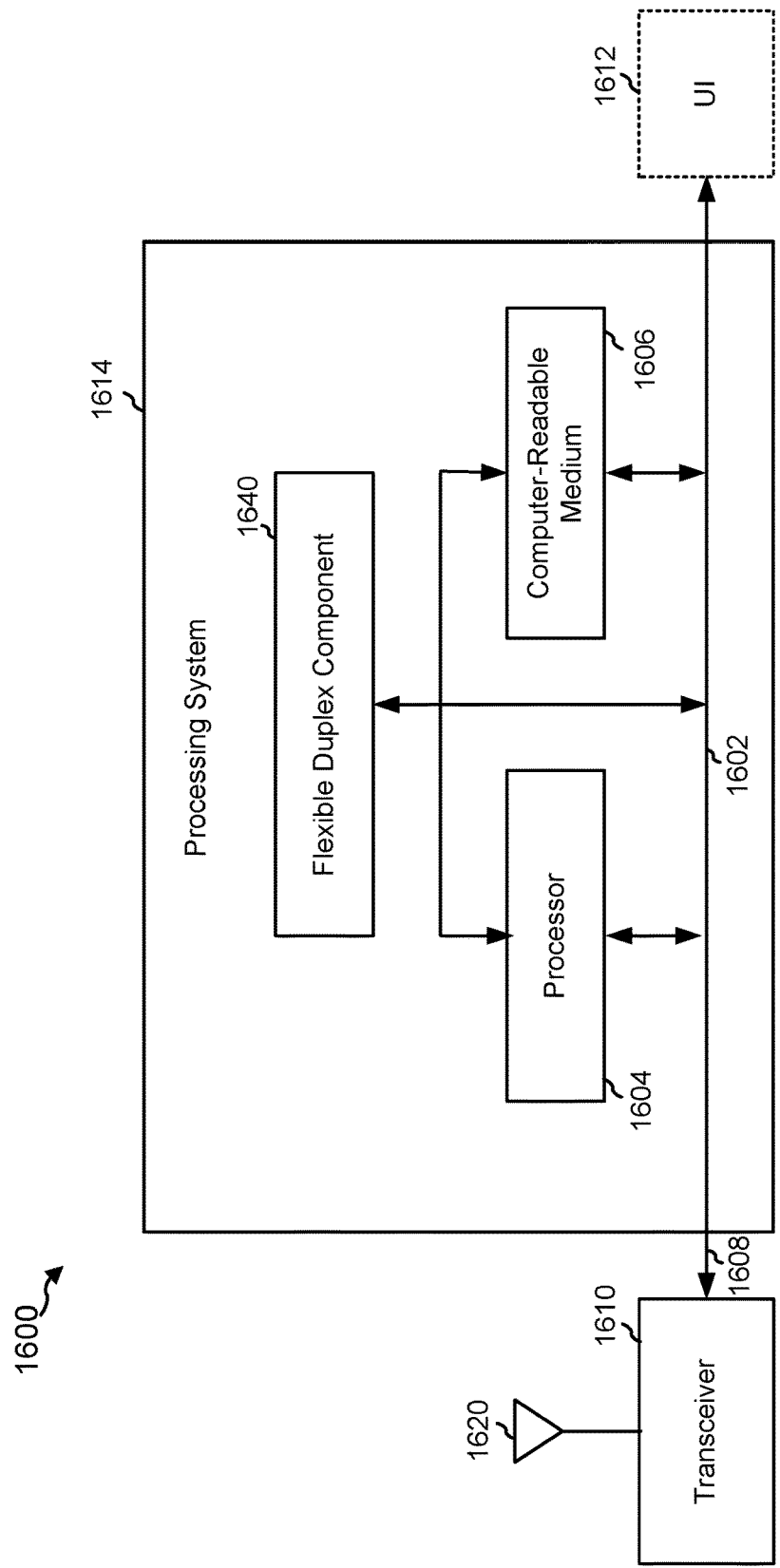
FIG. 16 is a diagram illustrating an example of a hardware implementation for an apparatus employing a processing system.

FIG. 16 is a block diagram conceptually illustrating an example hardware implementation for an apparatus 1600 employing a processing system 1614 configured in accordance with an aspect described herein. The processing system 1614 may be used to implement the UE 12 (FIG. 1) including a flexible duplex component 40. In another aspect, the processing system 1614 may be used to implement the eNB 16 (FIG. 1) or eNB 1006 (FIG. 10), each of which may include a flexible duplex component 1040. The processing system 1614 includes a flexible duplex component 1640. In one example, the apparatus 1600 may be the same or similar, or may be included with one of the UEs and/or eNodeBs described in various Figures. In such example, the flexible duplex component 1640 may correspond to, for example, the flexible duplex component 40 or the flexible duplex component 1040. In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 links together various circuits including one or more processors (e.g., central processing units (CPUs), microcontrollers, application specific integrated circuits (ASICs), field programmable gate arrays (FPGAs)) represented generally by the processor 1604, and computer-readable media, represented generally by the computer-readable medium 1606. The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610, which is connected to one or more antennas 1620 for receiving or transmitting signals. The transceiver 1610 and the one or more antennas 1620 provide a mechanism for communicating with various other apparatus over a transmission medium (e.g., over-the-air). Depending upon the nature of the apparatus, a user interface (UI) 1612 (e.g., keypad, display, speaker, microphone, joystick) may also be provided.

The processor 1604 is responsible for managing the bus 1602 and general processing, including the execution of software stored on the computer-readable medium 1606. The software, when executed by the processor 1604, causes the processing system 1614 to perform the various functions described herein for any particular apparatus. The computer-readable medium 1606 may also be used for storing data that is manipulated by the processor 1604 when executing software. The flexible duplex component 1640 as described above may be implemented in whole or in part by processor 1604, or by computer-readable medium 1606, or by any combination of processor 1604 and computer-readable medium It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   receiving a reconfiguration message indicating a change for a frequency division duplex (FDD) uplink band to a temporary time division duplex (TDD) band; and
   determining a reference configuration for a pair of FDD bands including an FDD downlink band and the temporary TDD band, the reference configuration indicating a pattern of sub-frames associated with the pair of FDD bands.

2. The method of claim 1, further comprising:
   determining a hybrid automatic repeat request (HARQ) timing for the FDD downlink band based on the reference configuration; and
   transmitting an acknowledgment status signal on the temporary TDD band in response to a transmission received on the FDD downlink band based on the HARQ timing, wherein the acknowledgment status signal is an acknowledgment (ACK) signal or a negative-acknowledgment (NACK).

3. The method of claim 2, wherein determining the HARQ timing comprises determining an uplink sub-frame of the temporary TDD band in which to transmit the acknowledgment status signal based on the reference configuration.

4. The method of claim 3, wherein the pair of FDD bands is aggregated and the FDD downlink band is associated with a primary cell.

5. The method of claim 1, further comprising:
   receiving a grant on a downlink sub-frame of the temporary TDD band, the grant scheduling an uplink transmission on the temporary TDD band; and
   determining an uplink sub-frame for the uplink transmission based on an FDD uplink HARQ timing.

6. The method of claim 1, further comprising:
receiving a grant on a downlink sub-frame of the temporary TDD band, the grant scheduling an uplink transmission on the temporary TDD band; and
determining an uplink sub-frame for the uplink transmission based on the reference configuration.

7. The method of claim 6, further comprising:
determining an uplink HARQ process number for the uplink transmission based on a 3-bit HARQ process number included in the grant.

8. The method of claim 1, further comprising:
determining that the pair of FDD bands is not aggregated with at least one second band;
identifying the FDD downlink band and the temporary TDD band as being associated with separate cells based on the determining that the pair of FDD bands are not aggregated with at least a second band;
allocating a soft buffer to each of the FDD downlink band and the temporary TDD band by equally dividing a total number of soft channel bits between the FDD downlink band and the temporary TDD band; and
determining a maximum number of HARQ processes for each of the FDD downlink band and the temporary TDD band based on the reference configuration, wherein the maximum number of HARQ processes is used for soft buffer management in each separate cell.

9. The method of claim 1, further comprising:
determining that the pair of FDD bands is aggregated with at least one second band;
identifying the FDD downlink band and the temporary TDD band as being associated with a single cell in response to determining that the pair of FDD bands are aggregated with the at least one second band;
allocating a soft buffer to be shared between the FDD downlink band and the temporary TDD band; and
determining a maximum number of HARQ processes for the single cell of the FDD downlink band and the temporary TDD band based on the reference configuration, wherein the maximum number of HARQ processes is used for soft buffer management.

10. The method of claim 9, further comprising:
receiving a downlink transmission either on the FDD downlink band or on the temporary TDD band but not simultaneously.

11. The method of claim 1, further comprising:
determining a downlink control information (DCI) format, a HARQ timing, and a physical uplink control channel (PUCCH) resource mapping for an uplink sub-frame of the temporary TDD band based on a band used to receive a physical downlink control channel (PDCCH) and a search space used to receive the PDCCH.

12. The method of claim 11, wherein the determining comprises determining the DCI format, the HARQ timing, and the PUCCH resource mapping based on an FDD format in response to the PDCCH being received on the FDD downlink band in a common search space.

13. The method of claim 11, wherein the determining comprises determining the downlink control information (DCI) format, the HARQ timing, and the PUCCH resource mapping based on a TDD format applicable to the reference configuration in response to the PDCCH being received on the temporary TDD band or in a user equipment (UE) specific search space.

14. The method of claim 1, further comprising:
determining a DCI format, a HARQ timing, and a PUCCH resource mapping for an uplink sub-frame of the temporary TDD band based on a downlink sub-frame used to receive a physical downlink control channel (PDCCH) and the reference configuration.

15. The method of claim 14, wherein the downlink sub-frame has a sub-frame index a fixed number of sub-frames before the UL sub-frame based on the reference configuration, and an FDD formatting is used for the DCI format, the HARQ timing, and the PUCCH resource mapping.

16. The method of claim 14, wherein the downlink sub-frame does not have a sub-frame index a fixed number of sub-frames before the UL sub-frame based on the reference configuration and a TDD formatting is used for the DCI format, the HARQ timing and the PUCCH resource mapping.

17. The method of claim 1, further comprising:
transmitting an uplink sounding reference signal (SRS) in a special sub-frame of the temporary TDD band based on a TDD reporting format, wherein an uplink timing advance control and a power control for SRS transmission are based on an FDD format.

18. The method of claim 1, further comprising:
determining whether the FDD downlink band is associated with a primary cell or a secondary cell;
determining a periodic channel state information (CSI) reporting format based on whether the FDD downlink band is associated with the primary cell or the secondary cell.

19. The method of claim 18, further comprising:
transmitting a periodic CSI report based on a TDD reporting format in response to determining that the FDD downlink band is associated with the primary cell.

20. The method of claim 18, further comprising:
transmitting a periodic CSI report based on a CSI reporting format of the primary cell in response to determining that the FDD downlink band is associated with the secondary cell.

21. An apparatus for wireless communications, comprising:
a transceiver configured to receive sub-frames of a downlink channel;
a memory; and
at least one processor communicatively coupled to the transceiver and to the memory via at least one bus, the at least one processor configured to:
receive a reconfiguration message indicating a change for a frequency division duplex (FDD) uplink band to a temporary time division duplex (TDD) band; and
determine a reference configuration for a pair of FDD bands including an FDD downlink band and the temporary TDD band, the reference configuration indicating a pattern of sub-frames associated with the pair of FDD bands.

22. The apparatus of claim 21, wherein the at least one processor is configured to:
determine a hybrid automatic repeat request (HARQ) timing for the FDD downlink band based on the reference configuration; and
transmit an acknowledgment status signal on the temporary TDD band in response to a transmission received on the FDD downlink band based on the HARQ timing, wherein the acknowledgment status signal is an acknowledgment (ACK) signal or a negative-acknowledgment (NACK).

23. The apparatus of claim 21, wherein the at least one processor is configured to:

receive a grant on a downlink sub-frame of the temporary TDD band, the grant scheduling an uplink transmission on the temporary TDD band; and determine an uplink sub-frame for the uplink transmission based on an FDD uplink HARQ timing.

24. The apparatus of claim 21, wherein the at least one processor is configured to:

receive a grant on a downlink sub-frame of the temporary TDD band, the grant scheduling an uplink transmission on the temporary TDD band; and determine an uplink sub-frame for the uplink transmission based on the reference configuration.

25. The apparatus of claim 21, wherein the at least one processor is configured to:

determine that the pair of FDD bands is not aggregated with at least one second band;

identify the FDD downlink band and the temporary TDD band as being associated with separate cells based on the determining that the pair of FDD bands are not aggregated with at least a second band;

allocate a soft buffer to each of the FDD downlink band and the temporary TDD band by equally dividing a total number of soft channel bits between the FDD downlink band and the temporary TDD band; and determine a maximum number of HARQ processes for each of the FDD downlink band and the temporary TDD band based on the reference configuration, wherein the maximum number of HARQ processes is used for soft buffer management in each separate cell.

26. The apparatus of claim 21, wherein the at least one processor is configured to:

determine that the pair of FDD bands is aggregated with at least one second band;

identify the FDD downlink band and the temporary TDD band as being associated with a single cell in response to determining that the pair of FDD bands are aggregated with the at least one second band;

allocate a soft buffer to be shared between the FDD downlink band and the temporary TDD band; and determine a maximum number of HARQ processes for the single cell of the FDD downlink band and the temporary TDD band based on the reference configuration, wherein the maximum number of HARQ processes is used for soft buffer management.

27. The apparatus of claim 21, wherein the at least one processor is configured to:

determine a downlink control information (DCI) format, a HARQ timing, and a physical uplink control channel (PUCCH) resource mapping for an uplink sub-frame of the temporary TDD band based on a band used to receive a physical downlink control channel (PDCCH) and a search space used to receive the PDCCH.

28. The apparatus of claim 21, wherein the at least one processor is configured to:

transmit an uplink sounding reference signal (SRS) in a special sub-frame of the temporary TDD band based on a TDD reporting format, wherein an uplink timing advance control and a power control for SRS transmission are based on an FDD format.

29. An apparatus for wireless communications, comprising:

means for receiving a reconfiguration message indicating a change for a frequency division duplex (FDD) uplink band to a temporary time division duplex (TDD) band; and means for determining a reference configuration for a pair of FDD bands including an FDD downlink band and the temporary TDD band, the reference configuration indicating a pattern of sub-frames associated with the pair of FDD bands.

30. A computer-readable medium storing computer executable code for wireless communications, comprising:

code for receiving a reconfiguration message indicating a change for a frequency division duplex (FDD) uplink band to a temporary time division duplex (TDD) band; and code for determining a reference configuration for a pair of FDD bands including an FDD downlink band and the temporary TDD band, the reference configuration indicating a pattern of sub-frames associated with the pair of FDD bands.

* * * * *